(12) United States Patent
Bull et al.

(10) Patent No.: US 9,844,070 B2
(45) Date of Patent: Dec. 12, 2017

(54) SYSTEM AND METHOD FOR DECOUPLING LONG TERM EVOLUTION MEDIA ACCESS CONTROL SCHEDULING FROM SUBFRAME RATE PROCEDURES

(71) Applicant: CISCO TECHNOLOGY, INC., San Jose, CA (US)

(72) Inventors: Oliver James Bull, Bristol (GB); Ian Neville Bendle, Thatcham (GB)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 14/803,475

(22) Filed: Jul. 20, 2015

(65) Prior Publication Data

US 2016/0073426 A1 Mar. 10, 2016

Related U.S. Application Data

(60) Provisional application No. 62/048,668, filed on Sep. 10, 2014.

(51) Int. Cl.
*H04W 72/12* (2009.01)
*H04W 72/04* (2009.01)
(Continued)

(52) U.S. Cl.
CPC ....... *H04W 72/1273* (2013.01); *H04L 5/0032* (2013.01); *H04L 5/0064* (2013.01);
(Continued)

(58) Field of Classification Search
CPC ............ H04W 72/1273; H04W 88/085; H04L 5/0032; H04L 5/0064; H04L 72/0426; H04L 72/1278; H04L 72/1289
See application file for complete search history.

(56) References Cited

U.S. PATENT DOCUMENTS 6,141,565 A 10/2000 Feuerstein et al.
6,771,934 B2 8/2004 Demers
(Continued)

FOREIGN PATENT DOCUMENTS

CN 104684052 A 6/2015
CN 105407533 A 3/2016
(Continued)

OTHER PUBLICATIONS

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
(Continued)

*Primary Examiner* — Alex Skripnikov
(74) *Attorney, Agent, or Firm* — Patterson + Sheridan, LLP

(57) ABSTRACT

A method is provided in one example embodiment and may include receiving data associated with a user equipment (UE) at a central baseband unit; determining one or more block time scheduling decisions for a plurality of subframes associated with the data; communicating the data to a remote radio unit; communicating the one or more block time scheduling decisions to the remote radio unit; and communicating the data to the UE from the remote radio unit based, at least in part, on the one or more block time scheduling decisions. In some cases, the method can include communicating the one or more block time scheduling decisions to the remote radio unit at a first rate and communicating the data to the remote radio unit at a second rate.

20 Claims, 11 Drawing Sheets

(51) Int. Cl.
    *H04L 5/00* (2006.01)
    *H04W 88/08* (2009.01)
(52) U.S. Cl.
    CPC ... *H04W 72/0426* (2013.01); *H04W 72/1278* (2013.01); *H04W 72/1289* (2013.01); *H04W 88/085* (2013.01)

(56) References Cited

U.S. PATENT DOCUMENTS

| | | |
|---|---|---|
| 7,151,937 B2 | 12/2006 | Jin et al. |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,107,950 B2 | 1/2012 | Amerijoo et al. |
| 8,170,544 B1 | 5/2012 | Satapathy et al. |
| 8,194,630 B2 | 6/2012 | Qvarfordt |
| 8,229,451 B2 | 7/2012 | Frenger et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,219,816 B2 | 12/2015 | Grayson |
| 9,510,237 B2 | 11/2016 | Nuss et al. |
| 2004/0085909 A1 | 5/2004 | Soliman |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2007/0008885 A1 | 1/2007 | Bonner |
| 2007/0253372 A1 | 11/2007 | Nakayasu |
| 2007/0280170 A1 | 12/2007 | Kawasaki |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0268833 A1 | 10/2008 | Huang |
| 2009/0054047 A1 | 2/2009 | Kylvaja |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0112982 A1 | 5/2010 | Singh et al. |
| 2010/0177722 A1 | 7/2010 | Guvenc |
| 2010/0227611 A1 | 9/2010 | Schmidt et al. |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0311449 A1 | 12/2010 | Whinnett |
| 2010/0317351 A1 | 12/2010 | Gerstenberger |
| 2011/0039539 A1 | 2/2011 | Maida et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0176497 A1 | 7/2011 | Gopalakrishnan |
| 2011/0182375 A1 | 7/2011 | Kim et al. |
| 2011/0195730 A1 | 8/2011 | Chami |
| 2011/0201277 A1 | 8/2011 | Eguchi |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046063 A1 | 2/2012 | Chande |
| 2012/0083201 A1 | 4/2012 | Truong |
| 2012/0087247 A1 | 4/2012 | Min et al. |
| 2012/0100849 A1 | 4/2012 | Marsico |
| 2012/0129537 A1 | 5/2012 | Liu et al. |
| 2012/0176980 A1* | 7/2012 | Moon ............... H04W 72/1226 370/329 |
| 2012/0178451 A1 | 7/2012 | Kubota |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0243461 A1* | 9/2012 | Bucknell ............... H04W 36/02 370/315 |
| 2012/0258720 A1 | 10/2012 | Tinnakornsurisphap et al. |
| 2012/0265888 A1 | 10/2012 | Roeland et al. |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0077482 A1 | 3/2013 | Krishna et al. |
| 2013/0079007 A1 | 3/2013 | Nagaraja et al. |
| 2013/0088983 A1* | 4/2013 | Pragada ............... H04W 16/14 370/252 |
| 2013/0107798 A1 | 5/2013 | Gao et al. |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |

(56) References Cited

U.S. PATENT DOCUMENTS

| | | |
|---|---|---|
| 2014/0018073 A1 | 1/2014 | Frenger |
| 2014/0018090 A1* | 1/2014 | Khoryaev ............ H04W 52/04 |
| | | 455/452.1 |
| 2014/0029524 A1 | 1/2014 | Dimou et al. |
| 2014/0031049 A1* | 1/2014 | Sundaresan .......... H04W 16/02 |
| | | 455/447 |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0146732 A1 | 5/2014 | Olufunmilola et al. |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0185467 A1 | 7/2014 | Heo |
| 2014/0194127 A1* | 7/2014 | Wang ................ H04W 36/0055 |
| | | 455/438 |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0220990 A1 | 8/2014 | Lorca Hernando |
| 2014/0226481 A1* | 8/2014 | Dahod ............ H04W 36/0055 |
| | | 370/235 |
| 2014/0226736 A1 | 8/2014 | Niu et al. |
| 2014/0233479 A1* | 8/2014 | Dahod ................ H04W 72/044 |
| | | 370/329 |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0286256 A1* | 9/2014 | Chowdhury ............ H04L 47/56 |
| | | 370/329 |
| 2014/0293906 A1 | 10/2014 | Chang et al. |
| 2014/0321282 A1* | 10/2014 | Pragada ............ H04W 36/0072 |
| | | 370/235 |
| 2014/0328277 A1 | 11/2014 | Xiao et al. |
| 2014/0335909 A1 | 11/2014 | Czerepinski |
| 2014/0362745 A1* | 12/2014 | Davydov ............ H04W 36/22 |
| | | 370/280 |
| 2015/0011222 A1 | 1/2015 | Brisebois et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063166 A1 | 3/2015 | Sif |
| 2015/0063223 A1 | 3/2015 | Shen |
| 2015/0063231 A1 | 3/2015 | Seo et al. |
| 2015/0078162 A1 | 3/2015 | Prakash et al. |
| 2015/0087325 A1 | 3/2015 | Nuss et al. |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0215918 A1* | 7/2015 | Wu .................. H04W 72/0433 |
| | | 370/329 |
| 2015/0256314 A1 | 9/2015 | Gauvreau et al. |
| 2015/0288767 A1 | 10/2015 | Fargano |
| 2015/0289167 A1 | 10/2015 | Alex |
| 2015/0312778 A1 | 10/2015 | Chandrasekhar et al. |
| 2015/0318994 A1 | 11/2015 | Walsh et al. |
| 2015/0341941 A1* | 11/2015 | Nguyen ............ H04W 72/082 |
| | | 370/332 |
| 2015/0351072 A1 | 12/2015 | Okmyanskiy et al. |
| 2015/0365934 A1* | 12/2015 | Liu ...................... H04L 5/0039 |
| | | 370/329 |
| 2015/0373698 A1 | 12/2015 | Uplenchwar et al. |
| 2015/0382242 A1 | 12/2015 | Sunavala |
| 2015/0382367 A1 | 12/2015 | Yanover et al. |
| 2016/0037550 A1 | 2/2016 | Barabell |
| 2016/0043944 A1 | 2/2016 | Felstaine |
| 2016/0100330 A1 | 4/2016 | Broustis |
| 2016/0191345 A1 | 6/2016 | Despotovic |
| 2016/0242147 A1* | 8/2016 | Tarlazzi ............ H04W 72/042 |
| 2016/0277953 A1 | 9/2016 | Andersson |
| 2016/0344587 A1 | 11/2016 | Hoffmann |
| 2017/0019811 A1 | 1/2017 | Parulkar |

FOREIGN PATENT DOCUMENTS

| | | | |
|---|---|---|---|
| EP | 1322048 | 6/2003 | |
| EP | 1718090 | 11/2006 | |
| EP | 1895801 | 3/2008 | |
| EP | 2296394 | 3/2011 | |
| EP | 2337395 | 6/2011 | |
| EP | 2395701 | 12/2011 | |
| EP | 2445265 | 4/2012 | |
| EP | 2466972 | 6/2012 | |
| EP | 2553595 | 12/2012 | |
| EP | 2632072 | 8/2013 | |
| EP | 2728926 | 5/2014 | |
| EP | 2741533 | 6/2014 | |
| EP | 2306761 | 7/2014 | |
| EP | 2832150 | 2/2015 | |
| EP | 2879444 | 6/2015 | |
| EP | 2996422 | 3/2016 | |
| EP | 3119036 | 1/2017 | |
| FR | EP 2632072 A1 * | 8/2013 | ............ H04L 1/1896 |
| GB | 2496908 | 5/2013 | |
| GB | 2518584 | 4/2015 | |
| WO | WO98/24199 | 6/1998 | |
| WO | WO00/38351 | 6/2000 | |
| WO | WO2007/074373 | 7/2007 | |
| WO | WO2007/133135 | 11/2007 | |
| WO | WO2010/006909 | 1/2010 | |
| WO | WO2010/064110 | 6/2010 | |
| WO | WO2010/125151 | 11/2010 | |
| WO | WO2011/085238 | 7/2011 | |
| WO | WO2011/088465 | 7/2011 | |
| WO | WO2011/090908 | 7/2011 | |
| WO | WO2011/137345 | 11/2011 | |
| WO | WO2012/148009 | 1/2012 | |
| WO | WO2012/055984 | 5/2012 | |
| WO | WO2012/079604 | 6/2012 | |
| WO | WO2013/005016 | 1/2013 | |
| WO | WO2013/006769 | 1/2013 | |
| WO | WO2013/041574 | 3/2013 | |
| WO | WO2013/079913 | 6/2013 | |
| WO | WO2013/082245 | 6/2013 | |
| WO | WO2013/086659 | 6/2013 | |
| WO | WO2013/112082 | 8/2013 | |
| WO | WO2013/144950 | 10/2013 | |
| WO | WO2013/169991 | 11/2013 | |
| WO | WO2014/001025 | 3/2014 | |
| WO | WO2014/051630 | 4/2014 | |
| WO | WO2014/059935 | 4/2014 | |
| WO | WO2014/071308 | 5/2014 | |
| WO | WO2014/087392 | 6/2014 | |
| WO | WO2014/087393 | 6/2014 | |

OTHER PUBLICATIONS

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

(56) References Cited

OTHER PUBLICATIONS

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.

"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex— France, Sep. 2014; 26 pages.

"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex— France, Sep. 2014; 86 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8 — 8.3.9 pp. 289-292; §8.5.21 pp. 357-365; §10.2.7 pp. 620-623; Annex B.3 pp. 2045-2052].

"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.

"ETSI TS-125-469 V9.3.0 (Oct. 2010) Technical Specification: Universal Mobile Telecommunications System (UMTS); UTRAN luh interface Home Node B (HNG) Application Part (HNBAP) signaling (3GPP TS 25.469 version 9.3.0 Release 9)," ©European Telecommunications Standards Institute 2010; Oct. 2010; 64 pages.

"ETSI TS 125 469 v11.2.0, Universal Mobile Telecommunications System (UMTS); UTRAN luh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.

"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.

"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.

"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.

"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.

"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.

"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex— France, Nov. 2014.

"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 [Sections 1 thru 9 only]; 252 pages.

"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0

(56) References Cited

OTHER PUBLICATIONS

Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Nov. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cedex—France; Nov. 2008.

"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212.version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Nov. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane

(56) References Cited

OTHER PUBLICATIONS congestion management (Release 13)," 3GPP, 650 Route des Lucioles, F-06921, Sophia Antipolis Cedex France, May 2014, 64 pages.

"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.

"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (Sa MOG); Stage 2 (Release 12);" 3rd Generation Partnership Project (3GPP), Sep. 2013, 157 pages.

"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.

"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.

"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.

"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.

"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.

"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.

"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.

"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.

3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the

(56) References Cited

OTHER PUBLICATIONS

Egyptian National Telecommunications Regulatory Authority (NTRA); 75 pages First Published on or about Sep. 15, 2015.
Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE INFOCOM 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.
Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages; https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.
"Broadband Forum Technical Report: TR-196 Frmto Access Point Service Data Model," Issue: 2, Issue Date: Nov. 2011; 46 pages.
Calhoun, P., "Diameter Base Protocol," Network Working Group RFC 3488, Sep. 2003; 147 pages.
Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.
"Cisco ASR 5000 Series Small Cell Gateway," Cisco White Paper, C11-711704-00, Jul. 2012, Cisco Systems, Inc., Printed in USA, ©2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
"Frame Structure—Downlink," Share Technote, first published on or about Jul. 9, 2012; 13 pages; http://www.sharetechnote.com/html/FrameStructure_DL_html.
"Fuzzy Logic," from Wikipedia, the free encyclopedia, Dec. 3, 2015; 12 pages.

Freescale Semiconductor, "Long Term Evolution Protocol Overview," White Paper, Document No. LTEPTCLOVWWP, Oct. 2008; 21 pages.
Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.
Goldsmith, A.J., et al., "Variable Rate Variable-Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto, University of OULU, Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitiation in LTE," vol. 2010, Article ID 273486, May 30, 2010.
Kwan, R., et al., "On Radio Admission Control for LTE Systems," Proc. of IEEE VTC-fail, Sep. 6-9, 2010.
La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013]; http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure." Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages; http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.

(56) References Cited

OTHER PUBLICATIONS

"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Madan, Ritesh, et al., "Fast Algorithms for Resource Allocation in Wireless Cellular Networks," IEEE/ACM Transactions on Networking, vol. 18, No. 3, Jun. 2010; 12 pages.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
Park, Jeongho, et al., "Interference Level Control in Mobile WiMAX Uplink System," 2009 IEEE Mobile WiMAX Symposium, Jul. 9-10, 2009; 5 pages.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"Plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
"QoS Class Identifier," from Wikipedia, the free encyclopedia, Oct. 7, 2015.
"RADIUS," Wikipedia, the free encyclopedia, 12 pages [Retrieved and printed Oct. 11, 2013] http://en.wikipedia.org/wiki/RADIUS.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Ruby, Ruksana, et al., "Uplink Scheduling Solution for Enhancing Throughput and Fairness in Relayed Long-Term Evolution Networks," IET Communications 2014, vol. 8, Issue 6, Apr. 2014; 13 pages.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Seo, H., et al., "A proportional-fair power allocation scheme for fair and efficient multiuser OFDM systems," in Proc. of IEEE Globecom, Dec. 2004, Dallas (USA).
Stefan Schwarz etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-a nd-cce-allocation.html.
Thapa, Chandra, et al., "Comparative Evaluation of Fractional Frequency Reuse (FFR) and Traditional Frequency Reuse in 3GPP-LTE Downlink," International Journal of Mobile Network Communications & Telematics (IJMNCT) vol. 2, No. 4, Aug. 2012; 8 pages.
"Transmission Time Interval," from Wikipedia, the free encyclopedia, May 2, 2013.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial No. GB1312321.1, 6 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freesca le Semiconductor, Document No. 3GPPEVOLUTIONWP; Jul. 2007; 27 pages.
EPO Aug. 12, 2014 Extended EPO Search Report and Opinion from European Application Serial No. 13195780.8.
EPO Nov. 19, 2015 Extended Search Report and Written Opinion from European Application EP13767700; 9 pages.

(56) References Cited

OTHER PUBLICATIONS

EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.
PCT Jun. 16, 2014 International Search Report and Written Opinion of the International Searching Authority for International Application Serial No. PCT/IL2013/000085.
PCT—Feb. 13, 2013 International Search Report and Written Opinion from International Application PCT/GB2012/052511; 28 pages.
EPO Jan. 27, 2016 Extended Search Report and Written Opinion from European Application No. 15183582.4.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.
3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.
"Cisco's One Platform Kit (onePK)," Networking Software IOS & NX-OS), Cisco Systems, Inc., First published on or about Mar. 3, 2014; 2 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
Ericsson, et al., "LPN Range Expansion in Co-Channel Deployment in Heterogeneous Networks," 3GPP Draft R1-125219 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991 , 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
EPO Jul. 29, 2014 Extended Search Report from European Application Serial No. EP13195673, 12 pages.
PCT Mar. 17, 2014 International Search Report and Written Opinion from International Application Serial No. PCT/IL2013/000086, 12 pages.
Research in Motion UK Limited, "Scoping the UMTS HetNet Study," 3GPP Draft R1-124276, 3rd Generation Partnership Project (3GPP), Mobile Competence Centre; 650; Route Des Lucioles; F-06921 Sophia-Antipolis; Sep. 2012; XP050662177.
Telecom Italia, et al., "Self-optimization use case: self-tuning of cell reselction parameters for load balancing," 3GPP Draft R3-071432, 3rd Generation Partnership Project (3GPP), Mobile Competence Centre; 650; Route Des Lucioles; F-06921 Sophia-Antipolis; Aug. 2007 XP050162260.
U.S. Appl. No. 14/479,343, filed Sep. 7, 2014, entitled "Operation of Base Station in a Celllular Communication Network," Inventor: Simon Burley.
U.S. Appl. No. 15/015,691, filed Feb. 4, 2016, entitled "System and Method for Optimizing Performance of a Communication Network," Inventor(s): Ziv Nuss, et al.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 15/008,045, filed Jan. 27, 2016, entitled "System and Method for Providing Dynamic Radio Access Network Orchestration," Inventors: Virginia Rosa de Sousa Teixeira, et al.
U.S. Appl. No. 14/811,580, filed Jul. 28, 2015 entitled "Determining Fractional Frequency Reuse Power Levels for Downlink Transmissions," Inventor: Ritesh K. Madan
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/961,552, filed Dec. 7, 2015, entitled "System and Method to Provide Uplink Interference Coordination in a Network Environment," Inventor: Ritesh K. Madan.

(56) References Cited

OTHER PUBLICATIONS

U.S. Appl. No. 14/993,859, filed Jan. 12, 2016, entitled "System and Method to Facilitate Centralized Radio Resource Management in a Split Radio Access Network Environment," Inventor: Ritesh K. Madan.

U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.

U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.

U.S. Appl. No. 15/018,677, filed Febuary 8, 2016, entitled "Mitigation of Uplink Interference Within Heterogeneous Wireless Communications Networks," Inventor: Pankaj Uplenchwar, et al.

U.S. Appl. No. 15/089,252, filed Apr. 1, 2016, entitled "Method and System for Dynamic Allocation of Resources in a Cellular Network," Inventors: Vladimir Yanover, et al.

U.S. Appl. No. 15/071,724, filed Mar. 16, 2016, entitled "Power Setting," Inventor: Pankaj Uplenchwar, et al.

U.S. Appl. No. 14/852,210, filed Sep. 11, 2015, entitled "System and Method for Providing Dynamic Radio Access Network Orchestration," Inventors: Virginia Rosa de Sousa Teixeira, et al.

Salim, Umer, et al., "State-of-the-art of and promising candidates for PHY layer approaches on access and backhaul network," INFSO-ICT-317941 iJOIN, D 2.1, $7^{th}$ Framework Programme, Nov. 4, 2013; 129 pages.

Wubben, Dirk, et al., "Benefits and Impact of Cloud Computing on 5G Signal Processing," IEEE Signal Processing Magazine, Nov. 2014.

Bernardos, Carlos J., et al., "Challenges of Designing Jointly the Backhaul and Radio Access Network in a Cloud-based Mobile Network," Future Network & Mobile Summit 2013 Conference Proceedings, Jul. 5, 2013; 10 pages.

EPO Oct. 24, 2016 Extended Search Report and Written Opinion of the International Searching Authority from European Application No. 16178746.

\* cited by examiner

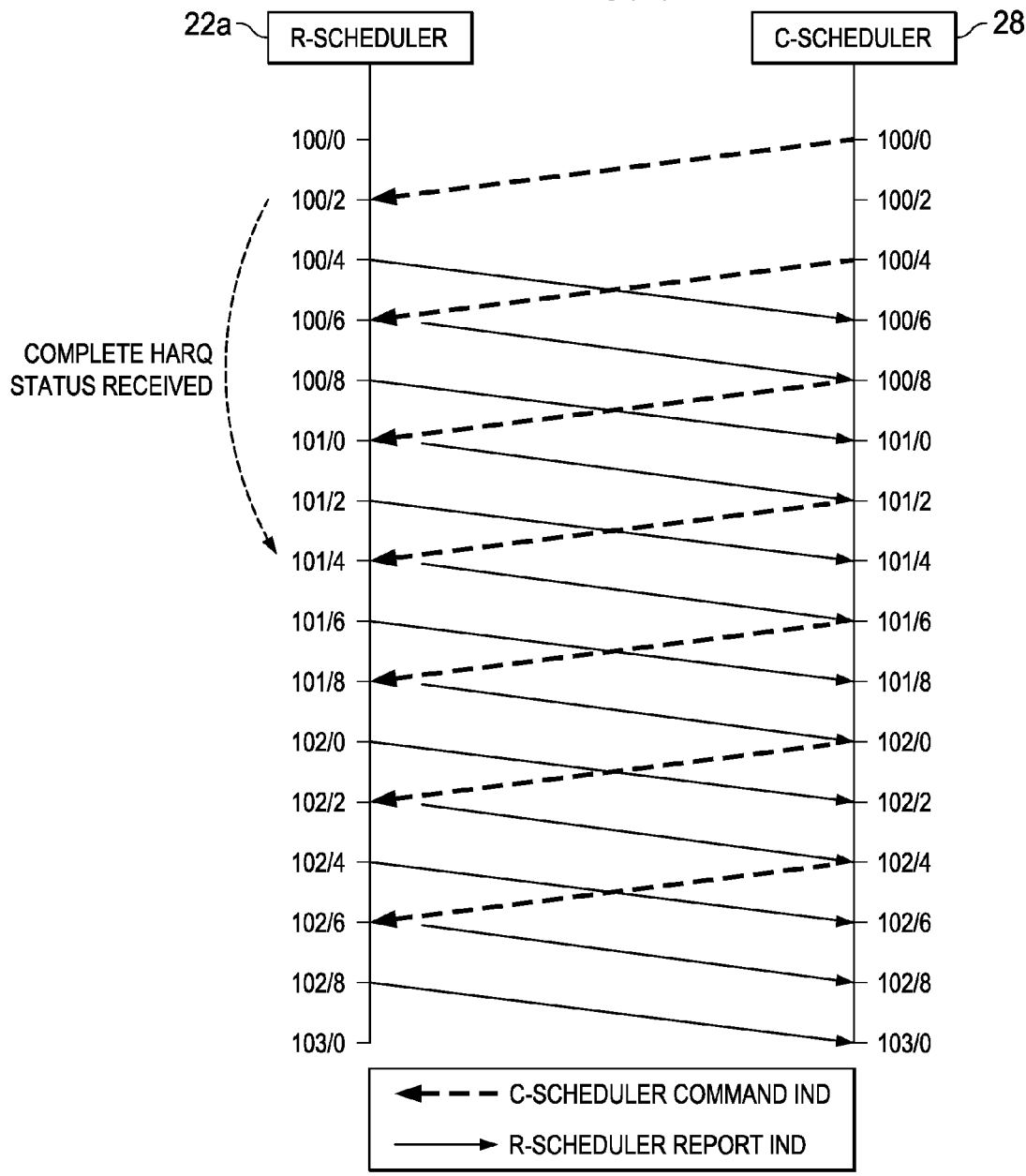

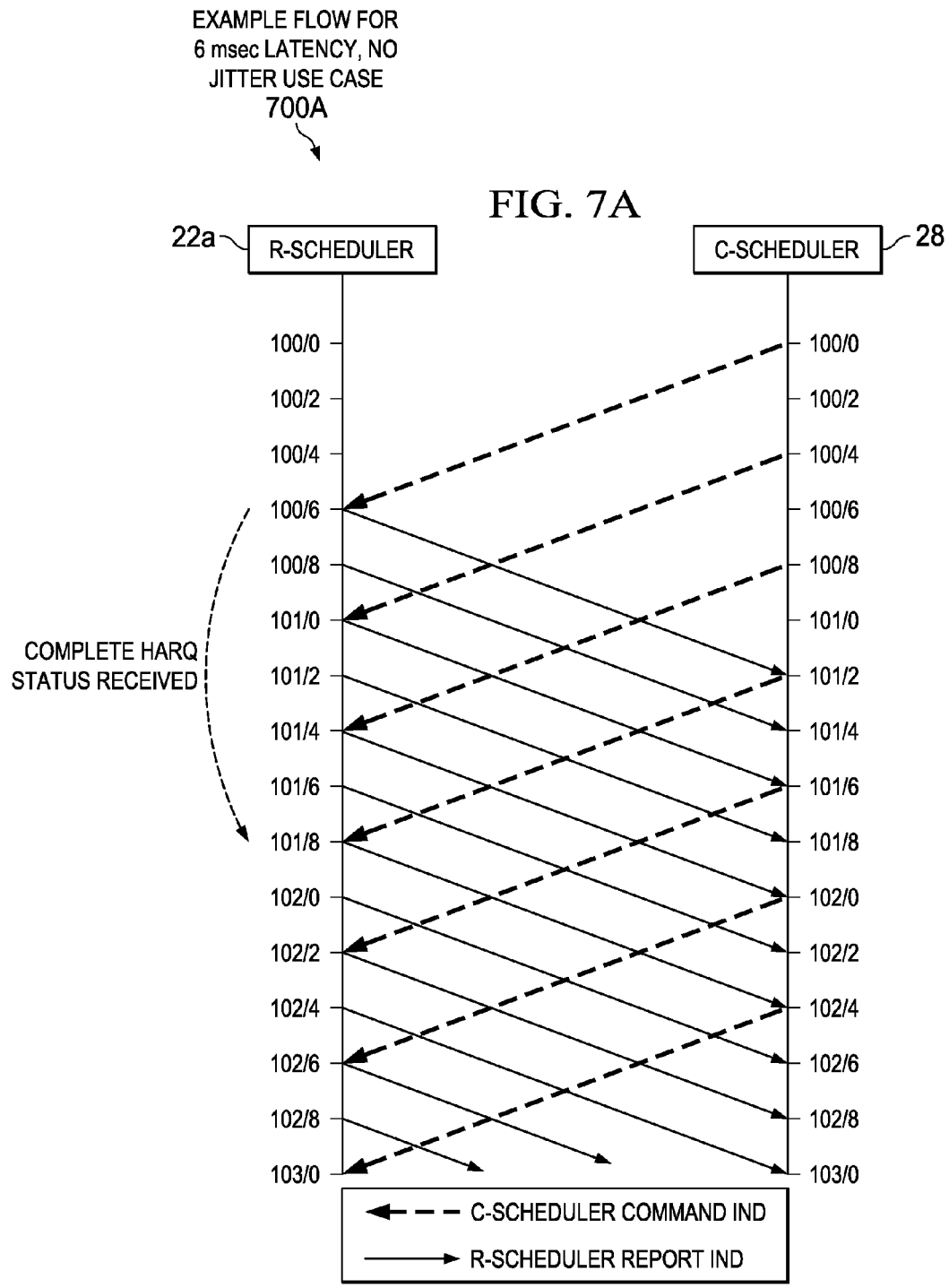

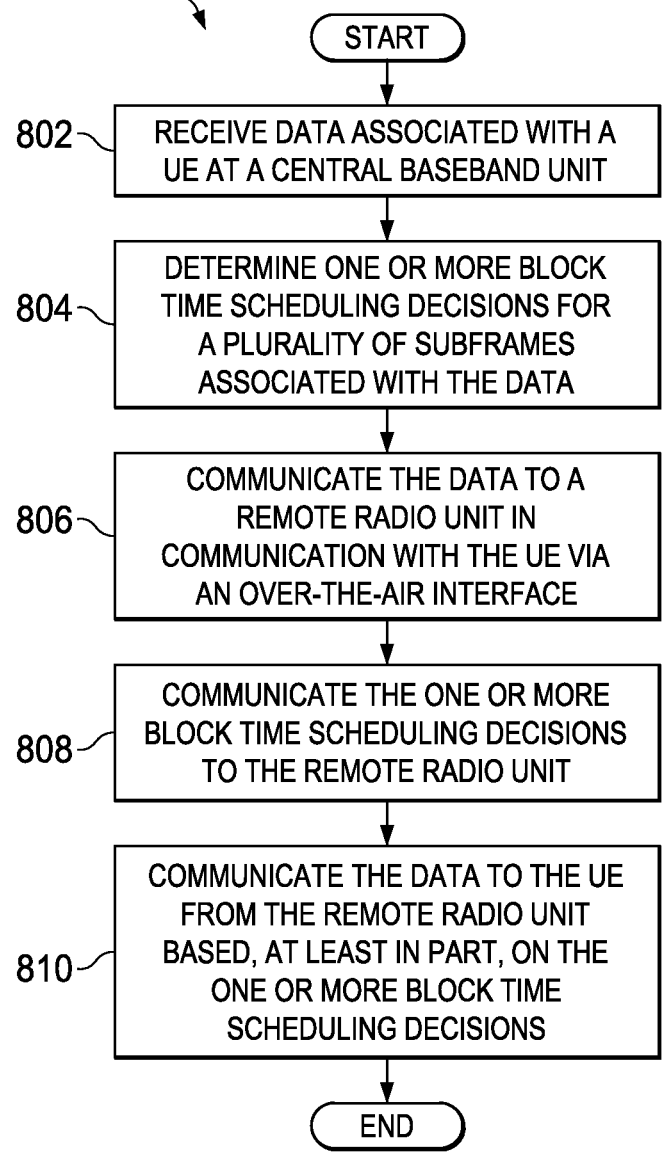

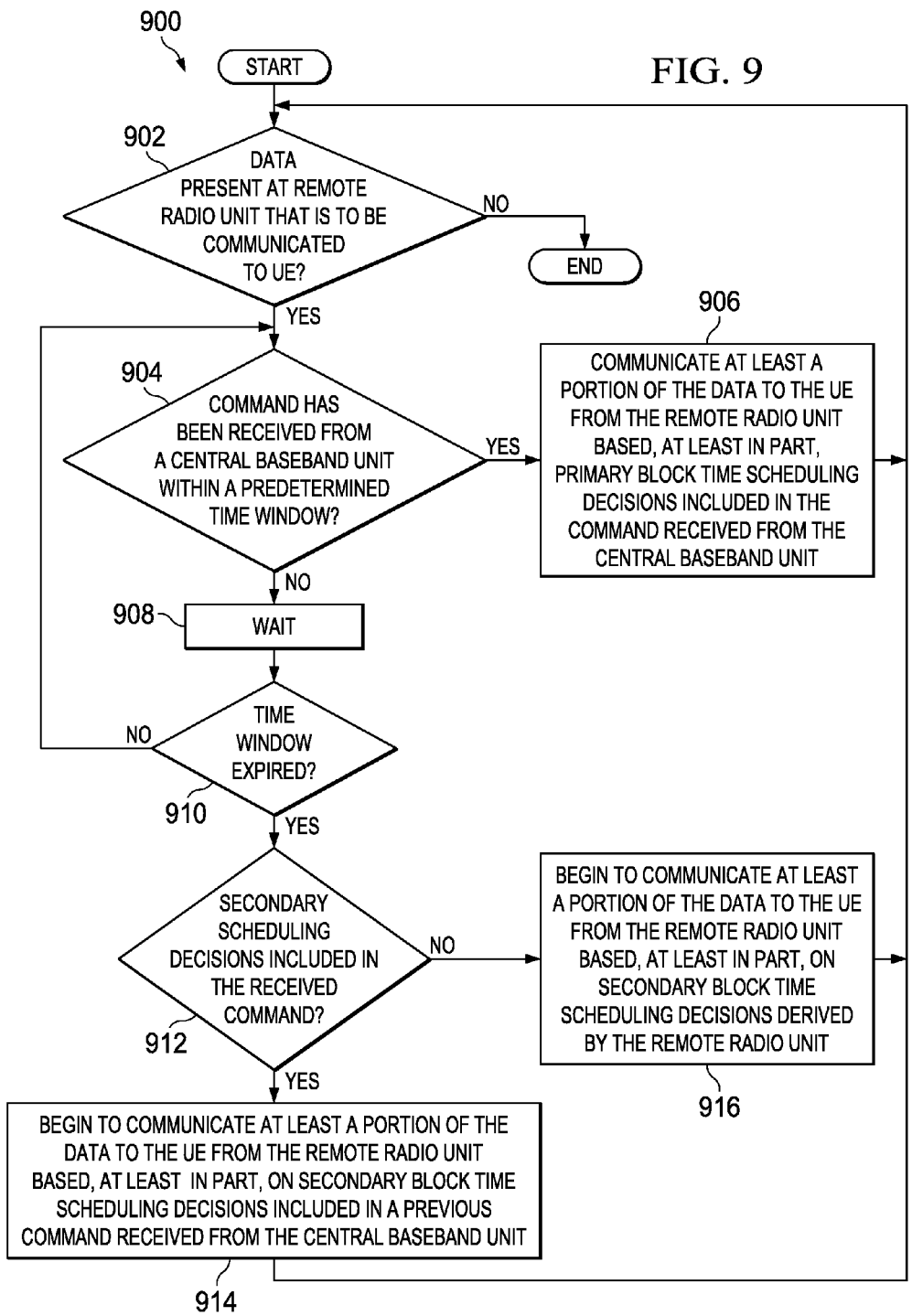

SYSTEM AND METHOD FOR DECOUPLING LONG TERM EVOLUTION MEDIA ACCESS CONTROL SCHEDULING FROM SUBFRAME RATE PROCEDURES

CROSS-REFERENCE TO RELATED APPLICATION

This application claims the benefit of priority under 35 U.S.C. §119(e) to U.S. Provisional Application Ser. No. 62/048,668, entitled "SYSTEM AND METHOD FOR A DECOUPLING A LONG TERM EVOLUTION MEDIA ACCESS CONTROL SCHEDULER FROM SUBFRAME RATE PROCEDURES," filed Sep. 10, 2014, which is hereby incorporated by reference in its entirety.

TECHNICAL FIELD

This disclosure relates in general to the field of communications and, more particularly, to a system and method for decoupling Long Term Evolution (LTE) Media Access Control (MAC) scheduling from subframe rate procedures.

BACKGROUND

Networking architectures have grown increasingly complex in communication environments. Mobile communication networks have grown substantially in subscriber base as end users become increasingly connected to mobile wireless environments. As the number of mobile subscribers increases, efficient management of communication network resources becomes more critical. In some instances, network service providers desire to centralize access control, mobility control and/or load control to manage communication network resources. However, there are significant challenges in centralizing control of communication network resources, particularly with regard to timing constraints for link latency between communication network resources.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is simplified flow diagram illustrating example flows associated with providing centralized LTE MAC scheduling in a particular use case in accordance with one potential embodiment of the communication system;

FIGS. 7A-7B are simplified flow diagrams illustrating other example flows associated with providing centralized LTE MAC scheduling in other use cases in accordance with various potential embodiments of the communication system;

FIG. 8 is a simplified flow diagram illustrating example operations associated with providing centralized LTE MAC scheduling in accordance with one potential embodiment of the communication system; and FIG. 9 is a simplified flow diagram illustrating other example operations associated with providing centralized LTE MAC scheduling in accordance with one potential embodiment of the communication system.

DETAILED DESCRIPTION OF EXAMPLE EMBODIMENTS

Overview

Figure 1:
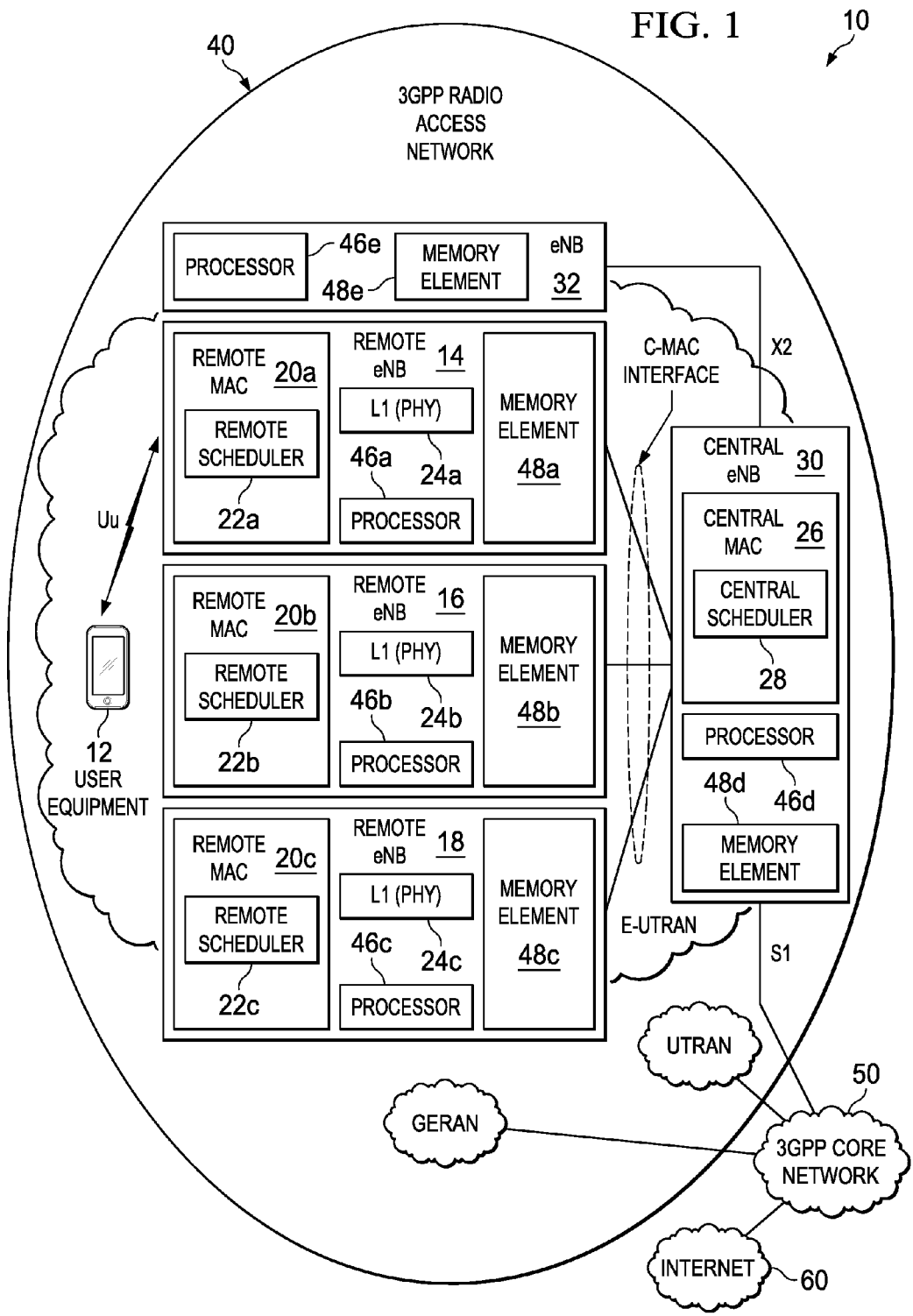
FIG. 1 is a simplified block diagram illustrating a communication system to facilitate providing centralized LTE MAC scheduling for one or more remote radio units for decoupling LTE MAC scheduling from subframe rate procedures according to one embodiment of the present disclosure.

A method is provided in one example embodiment and may include receiving data associated with a user equipment (UE) at a central baseband unit; determining one or more block time scheduling decisions for a plurality of subframes associated with the data; communicating the data to a remote radio unit; communicating the one or more block time scheduling decisions to the remote radio unit; and communicating the data to the UE from the remote radio unit based, at least in part, on the one or more block time scheduling decisions. In some instances, communicating the one or more block time scheduling decisions to the remote radio unit can be performed at a first rate and communicating the data to the remote radio unit can be performed at a second rate. In some instances, the second rate can be out of band from the first rate. In some instances, communicating the data to the UE at the remote radio unit can be based on at least one of: a primary block time scheduling decision included in the one or more scheduling decisions communicated to the remote radio unit and at least one of: a secondary block time scheduling decision included in the one or more scheduling decisions communicated to the remote radio unit; and a secondary block time scheduling decision derived at the remote radio unit.

In some cases, the method can include communicating one or more status reports to the central baseband unit from the remote radio unit, wherein the status reports are associated with the data to be communicated with the UE. In some instances, the method can include updating a rate associated with communicating the data to the remote radio unit based on a particular status report received from the remote radio unit.

In some cases, the central baseband unit can be a central evolved Node B (eNodeB) without a Layer 1 (L1) physical layer and the remote radio unit can be a remote eNodeB including a L1 physical layer. In some cases, the central eNodeB can be a part of virtualized computing platform operating in at least one of: a data center; and a cloud server center.

In some cases, the method can further include: determining one or more other block time scheduling decisions for a plurality of subframes associated with other data associated with one or more other UE; communicating the other data to one or more other remote radio units; communicating the one or more other block time scheduling decisions to the one or more other remote radio units; and communicating the other data to the one or more other UE from the one or more other remote radios unit based, at least in part, on the one or more other block time scheduling decisions.

A system is provided in one example embodiment and may include a central baseband unit comprising at least one memory element for storing data, at least one processor that executes instructions associated with the data and a central scheduler; a remote radio unit comprising at least one memory element for storing data, at least one processor that executes instructions associated with the data and a remote scheduler, wherein the central baseband unit and the remote radio unit operate to perform operations for the system comprising: receiving user equipment (UE) data associated with a UE at the central baseband unit; determining one or more block time scheduling decisions for a plurality of subframes associated with the UE data; communicating the UE data to the remote radio unit; communicating the one or more block time scheduling decisions to the remote radio unit; and communicating the UE data to the UE from the remote radio unit based, at least in part, on the one or more block time scheduling decisions.

In some cases, the system can further include an interface interconnecting the central baseband unit with the remote radio unit and one or more other remote radio units, wherein the interface comprises a logical separation into at least one data plane portion and at least one control plane portion. In some instances, the at least one data plane portion of the interface can include a user data plane interface to communicate the UE data from a central Media Access Control (MAC) layer of the central baseband unit to a remote MAC layer of the remote radio unit. In some instances, the at least one control plane portion of the interface can include a first control plane interface to communicate the block time scheduling decisions between the central scheduler of the central baseband unit and the remote scheduler of the remote radio unit. In yet other instances, the at least one control plane portion of the interface can further include a second control plane interface to allow the central baseband unit to configure operation of the remote radio unit.

EXAMPLE EMBODIMENTS

Turning to FIG. 1, FIG. 1 is a simplified block diagram illustrating a communication system 10 to facilitate providing centralized LTE MAC scheduling for one or more remote radio units for decoupling LTE MAC scheduling from subframe rate procedures in a network environment according to one embodiment of the present disclosure. This particular configuration may be tied to the 3rd Generation Partnership Project (3GPP) Evolved Packet System (EPS) architecture, also sometimes referred to as the LTE EPS architecture. Alternatively, the depicted architecture may be applicable to other environments equally.

The example architecture of FIG. 1 may include users operating user equipment (UE) 12, a 3GPP radio access network (RAN) 40 including remote evolved Node Bs (eNBs) 14, 16, 18, a central eNB 30 and an eNB 32. Note the terms 'eNB' and 'eNodeB' can be used interchangeably herein in this Specification. Remote eNB 14 may include a remote Media Access Control (MAC) layer 20a provisioned with a remote scheduler 22a, a Layer 1 (L1) physical (PHY) layer 24a, a processor 46a and a memory element 48a. Remote eNB 16 may include a remote MAC layer 20b provisioned with a remote scheduler 22b, an L1 (PHY) layer 24b, a processor 46b and a memory element 48b. Remote eNB 18 may include a remote MAC layer 20c provisioned with a remote scheduler 22c, an L1 (PHY) layer 24c, a processor 46c and a memory element 48c. Central eNB 30 may include a central MAC layer 26 provisioned with a central scheduler 28, a processor 46d and a memory element 48d.

Note the terms 'remote MAC' and 'R-MAC' may be used interchangeably and the terms 'central MAC' and 'C-MAC' may be used interchangeably herein in this Specification. Note additionally that the terms 'remote scheduler' and 'R-Scheduler' may be used interchangeably herein in this Specification and the terms 'central scheduler' and 'C-Scheduler' may be used interchangeably herein in this Specification. For purposes of the examples and embodiments described herein, it is assumed UE 12 is in communication with (e.g., connected to) a given remote eNB say, for example remote eNB 14, via an over-the-air Uu interface with remote eNB 14 for one or more subscriber/UE Data Sessions such as, for example, an IP connectivity access network (IP-CAN) session, a packet data network (PDN) session, etc. which supports one or more data flows for the subscriber/UE. It should be understood, however, that UE 12 and/or any number of other UE can be connected to any remote eNB 14, 16, 18 within communication system 10 within the scope of the teachings of the present disclosure.

Note that although each R-Scheduler 22a-22c is illustrated in FIG. 1 as being provisioned within each respective R-MAC layer 20a-20c for each respective eNB 14, 16, 18, each R-Scheduler 22a-22c could also be provisioned external to each respective R-MAC layer 20a-20c for each respective eNB 14, 16, 18. In various embodiments, each L1 (PHY) layer 24a-24c for each respective remote eNB 14, 16, 18 may be implemented as a transceiver, a modem, a Radio Frequency (RF) unit, combinations thereof or the like to effectuate over-the-air communications to/from one or more (e.g., UE 12). Remote eNBs 14, 16, 18 are assumed to be the last node before a given UE including RF capabilities.

As shown in FIG. 1, central eNB 30 may couple to each remote eNB 14, 16 18 via respective C-MAC interfaces; central eNB 30 may couple to eNB 32 via an X2 interface; and central eNB 30 may further couple to a 3GPP core network 50 via an S1 interface. In various embodiments, C-MAC interfaces may be open standard or proprietary interfaces as specified by a vendor, service provider and/or network operator. 3GPP core network 50 may further interface with a packed data network (PDN), such as for example, internet 60. The 3GPP core network is typically referred to as the Evolved Packet Core (EPC) for LTE networks. Each of the elements of FIG. 1 may couple to one another through the simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In various embodiments, 3GPP RAN 40 may provide a communications interface between remote eNBs 14, 16, 18 and 3GPP core network 50 and/or internet 60. In various embodiments, 3GPP RAN 40 may include access networks such as a Global System for Mobile Communications (GSM) Enhanced Data Rates for GSM (EDGE) radio access network (GERAN), generally referred to as 2G, a Universal Mobile Telecommunications System (UMTS) Terrestrial radio access network (UTRAN), generally referred to as 3G, and/or a LTE access network such as evolved UTRAN (E-UTRAN), generally referred to as 4G or LTE/LTE-Advanced (LTE-A). The GERAN and UTRAN may interface with 3GPP core network 50 via one of more network elements such as, for example, one or more Node Bs (NodeBs), one or more Radio Network Controllers (RNCs), one or more Serving General Packet Radio Service (GPRS) Support Nodes (SGSNs) and one or more Gateway GPRS support nodes (GGSNs). These network elements are not shown in order to illustrate other features of communication system 10.

Remote eNBs 14, 16, 18 and eNB 32 may be used to provide E-UTRAN coverage for 3GPP RAN 40 and may interface with 3GPP core network 50 using, for example, one or more Mobility Management Entities (MMEs), one or more serving gateways (SGWs), one or more Packet Data Network (PDN) gateways (PGWs), etc. In various embodiments, central eNB 30 may couple to 3GPP core network 50 via a central eNB gateway (GW). These network elements are also not shown in order to illustrate other features of communication system 10. 3GPP core network 50 may include other elements such as one or more Policy and Charging Rules Functions (PCRFs), one or more Authentication, Authorization and Accounting (AAA) elements, a Home Subscriber Server/Home Location Register (HSS/HLR), etc. to provide connectivity for UE 12 to external PDNs, such as internet 60, to implement QoS on packet flows, to provide enhanced services to UE 12, stateful firewalls, Traffic Performance Optimization, etc. These elements are also not shown in order to illustrate other features of communication system 10.

As shown in FIG. 1, remote eNBs 14, 16, 18 and eNB 32 can offer suitable connectivity to one or more UE (e.g., UE 12) using any appropriate protocol or technique. For example, in addition to providing E-UTRAN coverage, remote eNBs 14, 16, 18 and eNB 32 may also allow one or more UEs (e.g., UE 12) to connect to a wired network. Thus, remote eNBs 14, 16, 18 and eNB 32 may offer cellular connectivity to one or more UEs using 4G/LTE/LTE-A, or any other appropriate standard. In some embodiments, remote eNBs 14, 16, 18 and eNB 32 may also be provisioned with capabilities via respective wireless transceivers to provide wireless connectivity to one or more UEs using one or more wireless technologies such as WiFi, Bluetooth™, WiMAX, etc.

It should be noted that the remote eNB architecture of communication system 10 is equally applicable to small cell architectures, where one or more remote eNBs 14, 16, 18 may be implemented/deployed as remote Home evolved Node Bs (HeNBs) which could couple to a central HeNB-GW via a service network, such as, for example, a broadband IP network, the Internet, etc. In turn, the central HeNB-GW could connect to 3GPP core network 50 via one or more SGWs and one or more MMEs.

Before detailing some of the operational aspects of FIG. 1, it is important to understand common characteristics of LTE MAC scheduling as generally operated in commercial architectures. The following foundation is offered earnestly for teaching purposes only and, therefore should not be construed in any way to limit the broad teachings of the present disclosure. Small cells by their nature are single cell eNBs and as such are wholly contained in a single processing unit. An alternate architecture to small cells is to separate the radio processing and baseband processing, keeping the former remote and moving the latter central. This can enable multiple remote radio units to connect to a single central baseband unit. This often relies on proprietary and dedicated link technology to connect the two network elements in order to achieve the link bandwidth and latency required.

An alternate solution is to separate the remote unit and central unit using standard packetized IP networks, which inherently have delay and jitter. The main benefit of the separation is to permit the central baseband unit to perform 3GPP Layer 2 scheduling and management across multiple remote radio units. As such, however, there are tight latency requirements of less than 1 millisecond (ms) for such links to permit data flow and hybrid automatic repeat-request (HARQ) procedures to occur. In general, a HARQ response is an acknowledgment by a given UE for a corresponding data transmission received by the UE which indicates whether or not the data transmission was successfully decoded or not by the UE. The HARQ response can either be a positive acknowledgment (ACK) or a negative acknowledgment (NACK). HARQ procedures are performed close to the radio interface (e.g., L1) to minimize the response latency and/or retransmission time, in the case of a decode failure. Thus, the HARQ procedure can be viewed as an N-process stop-and-wait reliable transmission method with ACK/NACK feedback. For Frequency Division Duplexing (FDD) operation, this is specified in 3GPP standards as 8 HARQ processes with a 4 msec feedback cycle.

In accordance with one embodiment, communication system 10 can overcome the aforementioned shortcomings (and others) by providing a solution that can permit central scheduling to occur across a link latency that may be greater than 1 msec. For the architecture of communication system 10, central eNB 30 may represent a central 'baseband' unit, which may transmit block (in time) MAC frame scheduling decisions to each of remote eNBs 14, 16, 18, which may represent remote 'radio' units for interfacing with one or more UE (e.g., UE 12 in communication with remote eNB 14) via over-the-air Uu interfaces for uplink (UL) (e.g., from UE toward eNB) and/or downlink (DL) (e.g., from eNB toward UE) communications. Note the terms 'scheduling decisions' and 'scheduling commands' can be referred to interchangeably herein in this Specification.

In various embodiments, the solution provided by communication system 10 may provide for block in time transmissions and application of scheduling decisions from a central baseband unit (e.g., central eNB 30) to one or more remote radio units (e.g., remote eNBs 14, 16, 18) across a packetized link, which may have non-ideal and/or sub-ideal latency. Note the terms 'block in time' and 'block time' with regard to scheduling decisions performed by C-Scheduler 28 are used interchangeably herein in this Specification. By 'non-ideal latency' it is meant that the one-way latency may be greater than 1 millisecond (msec) with reasonable link variance (e.g., jitter), say, for example, 50% of the latency. In various embodiments, it may be assumed that the link quality for the C-MAC interface between central eNB 30 and remote eNBs 14, 16, 18 may be characterized according to ideal, near ideal, sub-ideal or non-ideal one-way latency/jitter requirements. In various embodiments, ideal one-way latency/jitter may be sub-250 microseconds (μsec); non-ideal one-way latency/jitter may be approximately 30 msec; sub-ideal one-way latency/jitter may be approximately 6 msec; and near ideal one-way latency/jitter may be approximately 1 msec.

In some embodiments, C-Scheduler 28 provisioned for central eNB 30 may provide scheduling decisions to remote eNBs 14, 16, 18 for every Transmission Block (TB) of data to be communicated between remote eNBs and UE served thereby. As generally provided in 3GPP architectures, data communicated between eNBs and UEs is communicated using Transmission Blocks of data. A Transmission Block of data is communicated in a particular Transmission Time Interval (TTI), which typically spans 1 msec for 4G/LTE communications.

In some embodiments, rather than performing scheduling decisions in a MAC scheduler every subframe, C-Scheduler 28 provisioned for central eNB 30 may also provide scheduling decisions to remote eNBs 14, 16, 18 for multiple subframes at once. For example, central eNB 30 via C-Scheduler 28 may make scheduling decisions say, for example, for a 16 msec, 8 msec, 4 msec, 2 msec or 1 msec block of subframes and may transmit the block time decisions to each of remote eNBs 14, 16, 18 via one or more C-scheduler 28 command messages or, more generally, commands. In general, block time scheduling decisions can be associated with a command duration, which may correspond to a length of time of subframe scheduling decisions for which a given C-Scheduler 28 command is expected to be applied at a given R-Scheduler. The term 'command duration' can be associated with primary block time scheduling decisions (e.g., a primary command duration) and secondary block time scheduling decisions (e.g., a secondary command duration).

In some embodiments, rigid timing constraints of LTE HARQ procedures may drive the cycle time for this aspect (e.g., transmit to re-transmit/new-transmit) to be 8 msec for Frequency-Division Duplexing (FDD) or 8 msec/12 msec/ 14 msec for Time-Division Duplexing (TDD) (depending on DL/UL configuration mode). However, link latency between a remote radio unit (e.g., remote eNB 14) and a central baseband unit (e.g., central eNB 30) can often be greater than such cycle times. Therefore, the solution provided by communication system 10 may require HARQ processing to remain autonomous within the remote radio unit(s) (e.g., within remote eNBs 14, 16, 18). Remote eNBs 14, 16 18 via respective R-Schedulers 22a-22c may, however, still implement block time scheduling decision(s) received from central eNB 30 for new transmissions after any HARQ retransmissions have been scheduled. This may apply to both the DL and UL scheduling decisions.

In order to further cope with potential link variance, the block time scheduling solution provided by communication system 10 may, in some embodiments, additionally provide for a two-tiered decision to be implemented by a given R-Scheduler (e.g., R-Scheduler 22a). In some embodiments, primary block time scheduling decisions may correspond those block time scheduling decisions received from C-Scheduler 28, which are expected to be applied by a given R-Scheduler, while secondary or 'fallback' decisions can be implemented by R-Scheduler if a subsequent expected scheduling decision (e.g., command) does not arrive from C-Scheduler 28 in a timely manner (e.g., within a predetermined window that the R-Scheduler expects to receive subsequent block time scheduling decisions from C-Scheduler 28). In some embodiments, C-scheduler 28 may include (e.g., embed) primary block time scheduling decisions and secondary block time scheduling decisions (e.g., of a same or shorter duration) in command messaging communicated to remote eNBs 14, 16, 18.

For example, in some embodiments, both 4 msec primary block time scheduling decisions and 2 msec secondary scheduling decisions can be included in command messaging communicated from C-Scheduler 28 to R-Schedulers 22a, 22b, 22c in case subsequent primary scheduling decisions are not received from C-Scheduler 28 in a timely manner. In some embodiments, secondary scheduling decisions can be derived autonomously at R-Schedulers 22a, 22b, 22c at a secondary block time rate (duration) rather than secondary block time scheduling decisions being included in command messaging from C-Scheduler 28. For example, in at least one embodiment, R-Schedulers 22a, 22b, 22c may be configured by a network operator, service provider, etc. to revert to a secondary decision basis (e.g., 1 msec, 2 msec, etc., as configured by a network operator, service provider, etc.) for autonomously scheduling UE communications if primary block time scheduling decisions are not received from C-Scheduler 28 in a timely manner (e.g., in a manner that allows R-Schedulers 22a, 22b, 22c to prepare transmissions according to the primary block time scheduling decisions). In such embodiments, commands from C-Scheduler 28 could include primary block time scheduling decisions and an indication (e.g., a flag, particular bit(s) being set/not set, etc.) indicating that an R-Scheduler revert to autonomously determining secondary decisions according to a secondary block time if subsequent primary decisions are not received in a timely manner. In some embodiments, command messaging from C-Scheduler 28 may include primary block time scheduling decisions along with an indication of a given duration (e.g., 4 msec, 2 msec, 1 msec, etc.) for secondary block time scheduling decisions that are to be determined autonomously at R-Schedulers 22a, 22b, 22c for the given duration.

For central eNB 30 (e.g., C-Scheduler 28 via central MAC layer 26) to make informed block time scheduling decisions, periodic status reports may be received from the remote eNBs 14, 16, 18 communicated to central eNB 30. Thus, the duration of the block in time decisions may be dependent on the link latency, though not directly tied to it. In various embodiments, status reports can include one or more of: HARQ feedback, radio channel quality, data rates (e.g., for UE communications), buffer status (e.g., as remote eNBs 14, 16, 18 buffer packets for transmission to or received from UE) combinations thereof or the like. In various embodiments, the rate of sending status reports can be driven by link latency and C-Scheduler 28 command rate.

In some embodiments, the status report rate can be fully decoupled from the command rate. In some embodiments, radio channel quality information in conjunction with data rate information can be used to adjust C-Scheduler 28 command rate. For example, during periods of low user data rate and good static radio conditions, C-scheduler 28 command rate could be lowered (e.g., resulting in less frequent, longer duration block time scheduling decisions). Conversely, if there is a large amount of data flow for a particular UE, an increased C-Scheduler 28 command rate (e.g., resulting in shorter duration block time scheduling decisions) can be used. Moreover, in some embodiments, the status reports can be used to define the duration of the primary and secondary block scheduling decisions based on both link latency and the radio performance defined in status reports.

It should be understood that embodiments of the present disclosure are not limited to one or two-tiered block time scheduling techniques. In various embodiments, any number of block time scheduling mechanisms can be configured for communication system 10 (e.g., one, two, three, etc. durations for block time scheduling decisions) such that one or more fallback block times may be selected according to operating and/or equipment conditions in communication system 10. For example, in some embodiments, a first level of fallback block time scheduling decisions can be used under ideal or near-ideal latency/jitter conditions, a second level of fallback block time scheduling decisions can be used under sub-ideal latency/jitter conditions and a third level fallback block time scheduling decisions can be used under non-ideal latency/jitter conditions, or any combination of multi-tiered fallback conditions thereof can be used.

In addition to providing for block time scheduling decisions to be communicated to remote eNBs, embodiments of communication system 10 may also provide for one or more logical separations of the C-MAC interface interconnecting central eNB 30 and remote eNBs 14, 16, 18 into data and control plane interfaces, which may provide for enhanced data, control and/or configuration communications to be provided in communication system 10. In various embodiments, the C-MAC interface between central eNB 30 and each of remote eNB 14, 16, 18 may provide for a logical separation into a data plane interface portion in which user data can be communicated between central MAC layer 26 and each R-MAC layer 20a, 20b, 20c and a control plane interface portion in which block time scheduling decisions (e.g., primary and/or secondary) can be communicated to each of R-Scheduler 22a, 22b, 22c. In various embodiments, the data plane interface portion of the C-MAC interface may be referred to as a Layer 2 user data (L2-U) interface portion and the user data configuration control plane interface portion may be referred to as a Layer 2 user data configuration (L2-UC) interface.

In some embodiments, the control plane interface portion can further be separated into a first portion to handle user data configuration communications via the L2-UC interface portion and a second portion to handle set-up and configuration operations and/or communications between central eNB 30 and one or more remote eNBs (e.g., remote eNBs 14, 16, 18). In various embodiments, the second portion of the control plane interface portion can be identified generally as a layer 2 configuration (L2-C) interface portion, and is discussed in further detail herein in this Specification.

During operation, for example, data to be transmitted to a given UE (e.g., UE 12) may first be forwarded to a given remote eNB (e.g., remote eNB 14) using the L2-U data plane interface portion of the C-MAC interface, in order for central MAC layer 26 to make block time scheduling decisions for data transmissions from remote eNB 14 to UE 12. A Radio Link Control (RLC) layer in central eNB 30 may concatenate and segment higher layer Protocol Data Units (PDUs) into pre-derived packetized data blocks that can passed to central MAC 26. Central MAC 26 can receive the packetized user data blocks as MAC SDUs, which can be communicated to remote eNB 14 at a given user data flow rate via the L2-U interface portion of the C-MAC interface. Block time scheduling decisions (e.g., primary and/or fallback) associated with the user data blocks can be communicated to remote eNB 14 via C-Scheduler 28 and the L2-UC interface portion of the C-MAC interface to R-Scheduler 22b. In turn, remote eNB 14 may transmit packetized data blocks to UE 12 via the L1 (PHY) layer 24b as directed by the block time scheduling decisions (e.g., primary or secondary) received from central eNB 30. As noted, in various embodiments, the rate for communicating the packetized user data blocks can be out of band from the rate for communicating block time scheduling decisions.

In various embodiments, the location and/or platform for central eNB 30 can be a localized unit, a specialized unit or part of a virtualized computing platform that can operate as part of or within a data center or cloud server center. In various embodiments, a virtualized computing platform can encompass an emulation of a computer system, network, etc., operating based on the computer architecture and/or functions of a real or hypothetical computer, computer system, network, etc. with particular implementations involving specialized hardware, software, or a combination of both. In various embodiments, a virtualized computing platform may execute or operate via a hypervisor-based virtualization or a container-based virtualization of a server (e.g., blade server, rack server, stand-alone server) using the server's hardware (e.g., processor and memory element) and/or operating system.

Thus, the operational aspects of central eNB 30 may be virtualized into a cloud-based architecture to allow for distributed control of remote eNBs 14, 16, 18. In various embodiments, remote eNBs 14, 16, 18, while having knowledge of static cell configuration and UEs for semi-static configuration, may not maintain dynamic configuration elements, as these may be commanded by central eNB 30 in a timely method. In various embodiments, central eNB 30 (or each virtualized instantiation of central eNB 30) may support up to 256 remote eNBs.

In various embodiments, the solution provided by communication system 10 provides for central baseband unit MAC scheduling (e.g., via C-Scheduler 28) of one or more remote radio units (e.g., remote eNBs 14, 16, 18) across a packetized link that may be experiencing non-ideal, sub-ideal, or near ideal link latency/jitter by aggregating scheduling commands across one or more block times (e.g., primary, secondary). The aggregating of scheduling commands across one or more block times can help to reduce the number of schedule cycles that would otherwise be required by C-Scheduler 28 to maintain a 1 msec subframe rate. In various embodiments, the solution provided by communication system 10 can be enabled by separation of the data plane carrying user data from the user data configuration plane carrying subframe rate scheduling decisions as well as by separation of the block subframe time scheduling from the central baseband unit to each of the one or more remote radio unit(s).

Thus, the solution provided by communication system 10 may provide several advantages over proprietary systems for creating a central baseband unit and remote radio units with tight link requirements. For example, in various embodiments, transmitting scheduling commands from a central baseband unit (e.g., central eNB 30) to one or more remote radio units (e.g., remote eNBs 14, 16, 18), as well as providing various scheduling feedback mechanisms may make using standard scheduling methods at a 1 msec subframe rate possible across a non-ideal, sub-ideal or near ideal link latency/jitter for a packetized link.

In various embodiments, UE 12 can be associated with users, employees, clients, customers, etc. wishing to initiate a flow in communication system 10 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 10. UE 12 may also be inclusive of a suitable interface to a human user such as a microphone, a display, a keyboard, or other terminal equipment.

UE 12 may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12 may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

As shown in FIG. 1, remote eNB 14, 16, 18; central eNB 30 and eNB 32 can each include a respective processor 46a-46e and a respective memory element 48a-48e. Additionally, remote eNB 14 can include remote MAC 20a, which may be provisioned with remote scheduler 22a, and can include L1 (PHY) layer 24a; remote eNB 16 can include remote MAC 20b, which may be provisioned with remote scheduler 22b, and can include L1 (PHY) layer 24b; and remote eNB 18 can include remote MAC 20c provisioned with remote scheduler 22c, and can include L1 (PHY) layer 24c. Further, central eNB 30 can include central MAC layer 26 provisioned with central scheduler 28. Hence, appropriate software and/or hardware is being provisioned in remote eNB 14, 16, 18; eNB 32; and central eNB 30 to facilitate centralized LTE MAC scheduling for one or more remote radio units in the network environment. Note that in certain examples, certain databases can be consolidated with memory elements (or vice versa), or the storage can overlap/exist in any other suitable manner.

In one example implementation, remote eNB 14, 16, 18; eNB 32; and central eNB 30 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate centralized frame scheduling activities (e.g., for networks such as those illustrated in FIG. 1). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of remote eNBs 14, 16, 18; eNB 32; and central eNB 30 can include memory elements for storing information to be used in achieving the centralized LTE MAC frame scheduling operations, as outlined herein. Additionally, each of these devices may include a processor that can execute software or an algorithm to perform centralized LTE MAC frame scheduling activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to remote eNB 14, 16, 18; eNB 32; and central eNB 30 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment (e.g., mobile nodes) can also include suitable interfaces for receiving, transmitting, and/or otherwise communicating data or information in a network environment.

Note that in certain example implementations, the centralized LTE MAC frame scheduling functions as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIG. 1, described in further detail below] can store data used for the operations described herein. This includes the memory elements being able to store software, logic, code, or processor instructions that are executed to carry out the activities described herein. A processor, including a hardware processor, can execute any type of instructions associated with the data to achieve the operations detailed herein. In one example, the processors [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 2A:
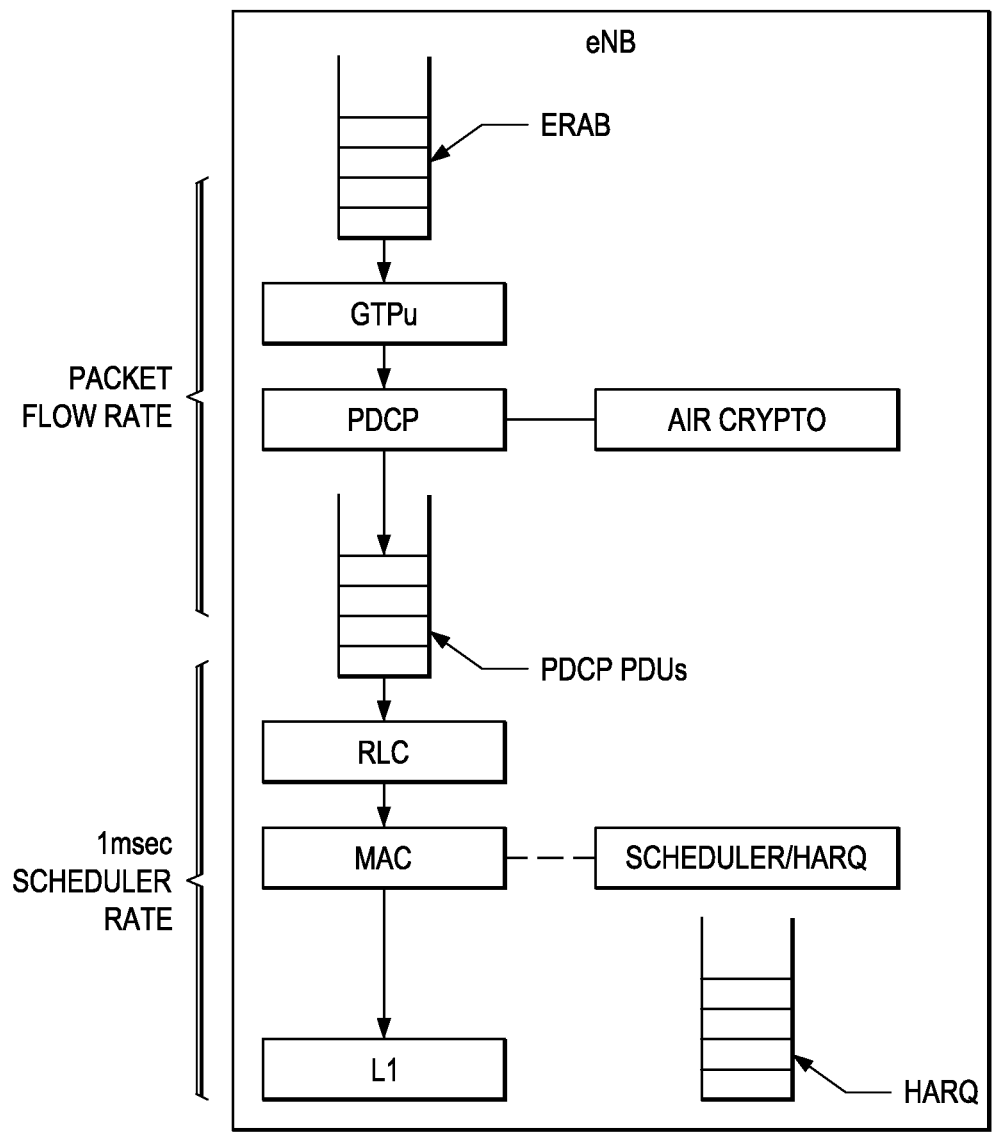
FIGS. 2A-2B are simplified schematic diagrams illustrating possible example details associated with the communication system.
Figure 2B:
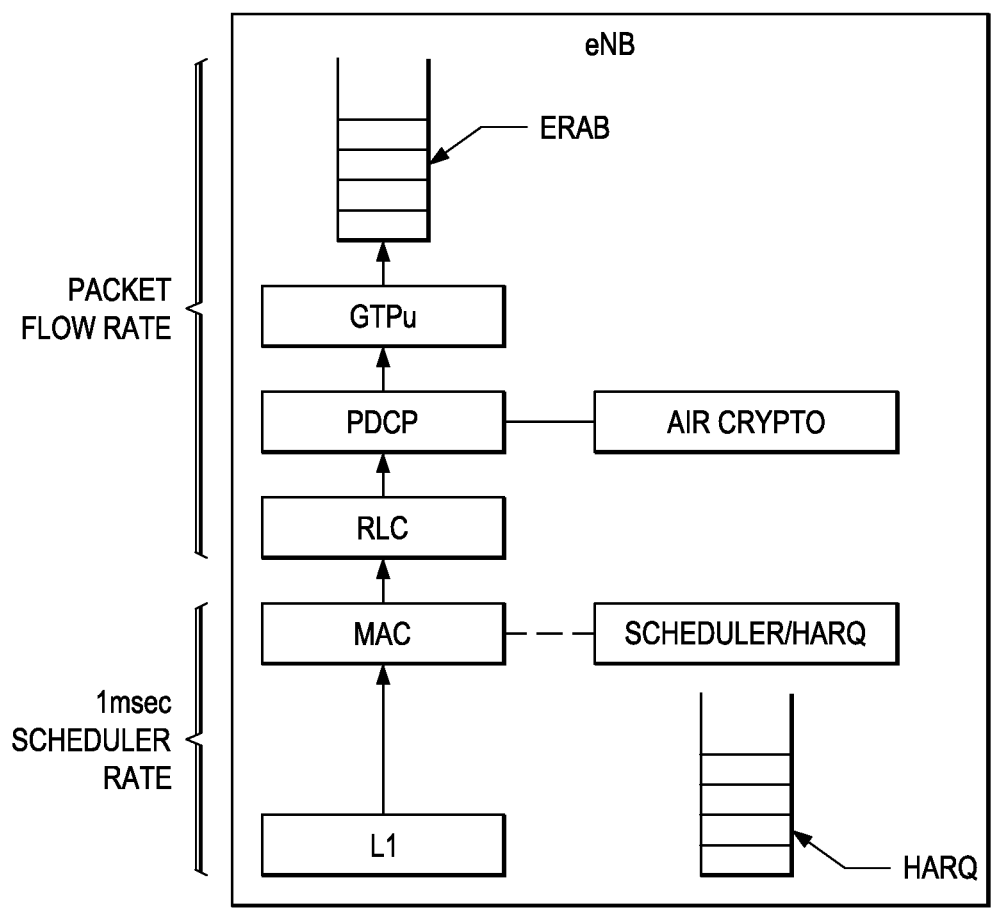

Turning to FIGS. 2A-2B are simplified schematic diagrams 200A-200B illustrating possible example details associated with the communication system. Referring to FIG. 2A, FIG. 2A is a simplified schematic diagram 200A illustrating possible example details associated with a standard eNB/HeNB (e.g., eNB 32) downlink protocol flow. Such information is offered earnestly and for teaching purposes only and, therefore, should not be construed in a way to limit the broad applications for the present disclosure.

As shown in FIG. 2A standard protocol flow can include a flow of packetized E-UTRAN Radio Access Bearers (ERABs). Each packetized ERAB may flow through a GPRS Tunneling protocol user plane (GTPu) tunnel via a GTPu layer to a Packed Data Convergence Protocol (PDCP) layer at a given packet flow rate. The PDCP may apply an air crypto (e.g., encryption) to the packets and/or other addressing/control information and may output Protocol Data Units (PDU) (e.g., PDCP PDUs) to the RLC layer. The RLC layer may receive the packets as RLC Service Data Units (SDUs), may apply addressing/control information to the packets and may output RLC PDUs to the MAC. The MAC, via a scheduler/HARQ function, may receive the packets as MAC SDUs, may construct MAC PDUs and may schedule delivery of the packets to a given UE at a subframe data delivery rate of 1 msec and may communicate the packets to the L1 (PHY) layer, which may communicate the packets over an air interface to the UE. As shown in FIG. 2A, the scheduler/HARQ functionality may maintain the HARQ processing and procedures of synchronous HARQ retransmissions.

Turning to FIG. 2B, FIG. 2B is a simplified schematic diagram 200B illustrating possible example details associated with a standard eNB/HeNB uplink protocol flow. The uplink protocol flow for FIG. 2B may be similar to, but opposite that shown in FIG. 2A, where uplink UE packets may flow up to the GTPu layer for transmission to the 3GPP core network.

Figure 3A:
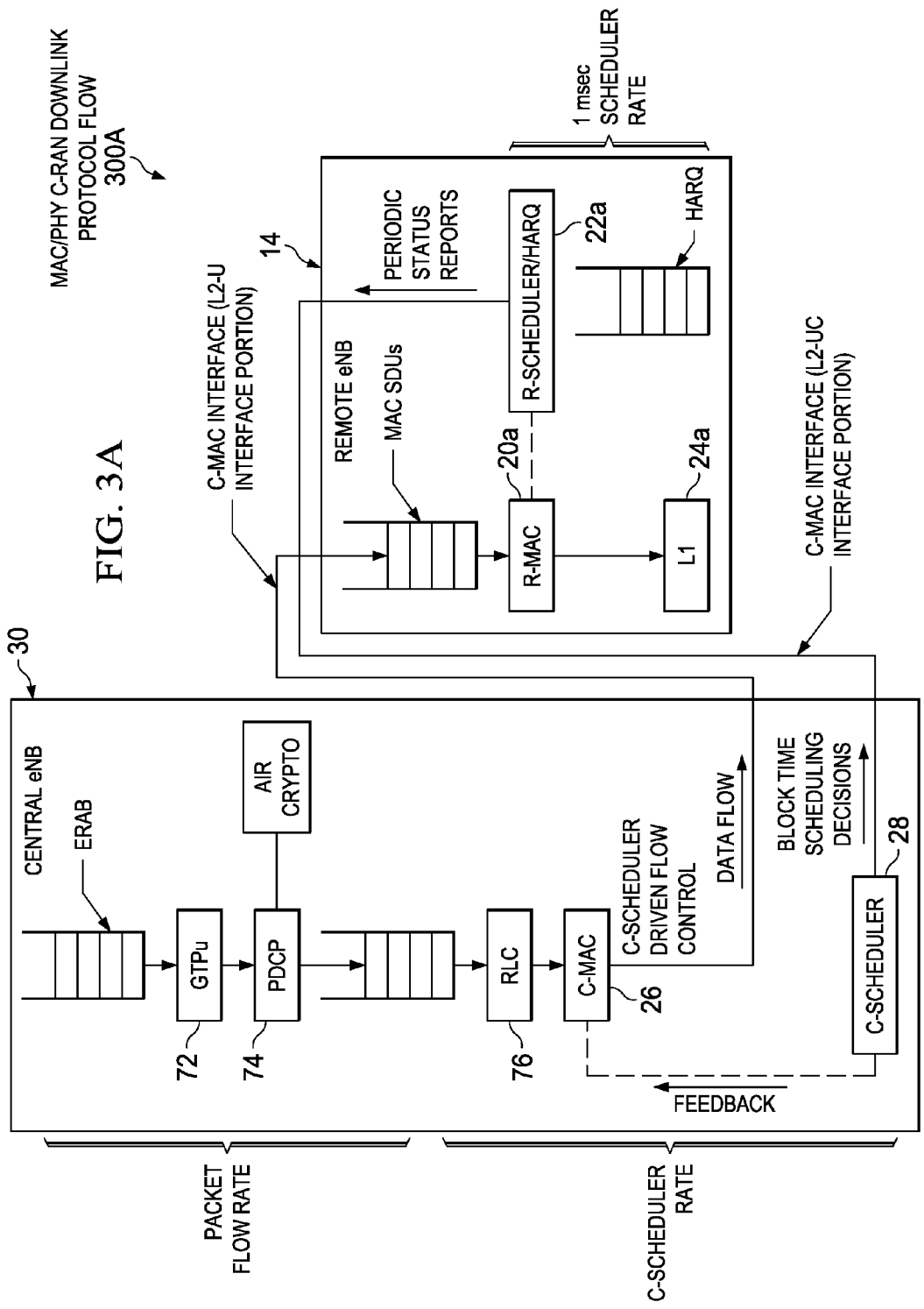
FIGS. 3A-3B are simplified schematic diagrams illustrating protocol flows associated with providing centralized LTE MAC scheduling in accordance with various potential embodiments of the present disclosure.
Figure 3B:
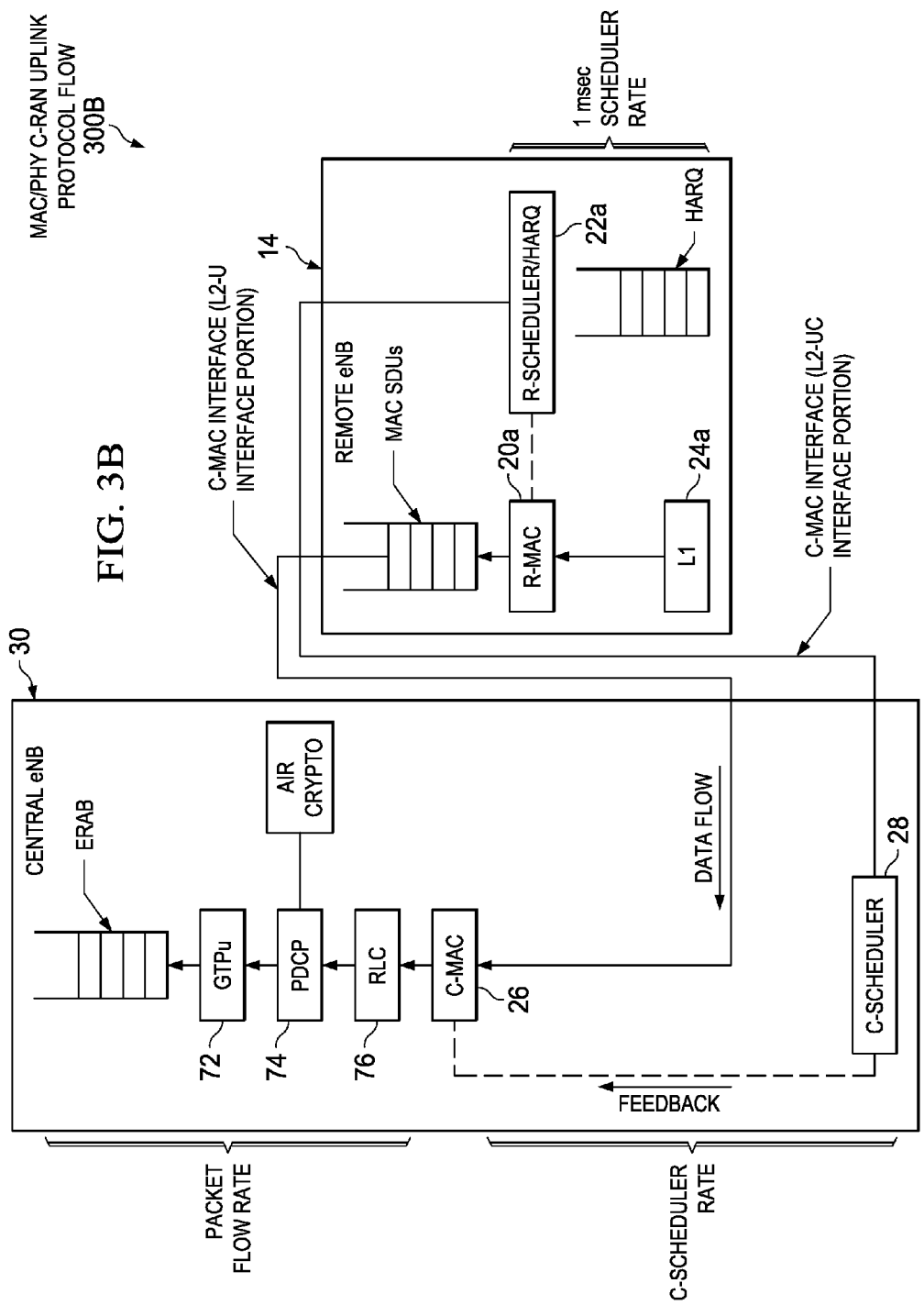

Referring to FIGS. 3A-3B are simplified schematic diagrams 300A-300B illustrating protocol flows associated with providing centralized LTE MAC scheduling in accordance with various potential embodiments of the present disclosure. Referring to FIG. 3A, FIG. 3A is a simplified schematic diagram 300A illustrating example details associated with a MAC/PHY centralized RAN (C-RAN) downlink protocol flow. FIG. 3A includes central eNB 30 and a given remote eNB, for example, remote eNB 14. Central eNB 30 includes a GTPu layer 72, a PDCP layer 74 (which may provide for air crypto), an RLC layer 76, central MAC layer 26 and C-Scheduler 28. Remote eNB 14 may include R-MAC layer 20a, R-Scheduler 22a and L1 (PHY) layer 24a. R-Scheduler 22a may include functionality to provide for HARQ processing and procedures, labeled as R-Scheduler/HARQ 22a in FIG. 3A.

As shown in FIG. 3A, during operation central eNB 30 via C-Scheduler 28 may communicate block time scheduling decisions, via the L2-UC portion of the C-MAC interface, to R-Scheduler 22a for remote eNB 14 at a first flow rate, for example, at a given C-Scheduler rate or command. In various embodiments, the C-Scheduler rate may be related to the time frame covered by the block time scheduling decisions (e.g., a 4 msec rate for 4 msec primary block time and 2 msec secondary block time scheduling decisions for multiple subframes for each of remote eNBs 14, 16, 18). Central eNB 30, via central MAC layer 26, may packetize MAC SDUs (e.g., user data) on the data plane asynchronous to normal subframe rate control procedures such that they can be delivered to remote eNB 14 ready for MAC PDU construction at the remote eNB. Central MAC 26 may communicate MAC SDUs to R-MAC layer 20a, via the L2-U portion of the C-MAC interface, at a second flow rate or data flow rate that may also be driven by the C-Scheduler rate. Thus, user data communications and subframe rate control communications may be 'out of band' or separated from each other, which, in various embodiments, may permit different levels of prioritization between user data and control communications as well as managing large volumes of data differently than the comparatively smaller volume of control information.

Consider an example in which C-Scheduler 28 can operate at a 1 msec rate, capable of delivering C-Scheduler commands for every subframe. In this example, it can be assumed that the primary and secondary block time scheduling decisions can be configured for 1 msec block times for a 1 msec C-scheduler 28 command rate. For this example, the data flow rate may be sufficient to allow R-Scheduler/HARQ 22a to process a given block time of scheduling decisions at a 1 msec R-scheduler rate for R-Scheduler/HARQ 22a as it also accounts for synchronous (and optionally asynchronous) HARQ retransmissions. Thus, for the present example, the data flow rate could be operated at a second rate, which could provide for delivering user data packets (e.g., MAC SDUs) out of band and to a different time base than the C-Scheduler 28 command rate. For example, the user data packets could be delivered to R-MAC layer 20a (e.g., R-Scheduler/HARQ 22a) at a second rate of 2 msec to provide 2 msec worth of data in each communication. Remote eNB 14 via R-MAC 20a may buffer the packets for transmission to a given UE (e.g., UE 12) according to the block time scheduling decisions.

In some embodiments, remote eNB 14 may also provide periodic status reports to central eNB 30 via the L2-UC portion of the C-MAC interface. In various embodiments, C-Scheduler 28 may use periodic status reports received from R-Scheduler/HARQ 22 to provide feedback to central MAC layer 26 for flow control of data to R-MAC layer 20a and/or to update the rate/duration of block time scheduling decisions being provided by C-scheduler 28.

Referring to FIG. 3B, FIG. 3B is a simplified schematic diagram 300B illustrating example details associated with a MAC/PHY centralized RAN (C-RAN) uplink protocol flow. FIG. 3B includes central eNB 30 and a given remote eNB, for example remote eNB 14. Central eNB 30 includes GTPu layer 72, PDCP layer 74 (which may provide for air crypto), RLC layer 76, central MAC layer 26 and C-Scheduler 28. Remote eNB 14 may include R-MAC layer 20a, R-Scheduler 22a and L1 (PHY) layer 24a. R-Scheduler 22a may include functionality to provide for HARQ processing and procedures.

In contrast to downlink protocol flow, there may be no hard real-time constraints for data transfer in the uplink, and as such, data packets can flow between the R-eNB and C-eNB as they are received or batched as needed. However, flow constraints regarding C-Scheduler 28 commands and R-Scheduler/HARQ 22a periodic status reports may apply to data transfers in the uplink in a manner similar to that as described for data transfers in the downlink.

Figure 4:
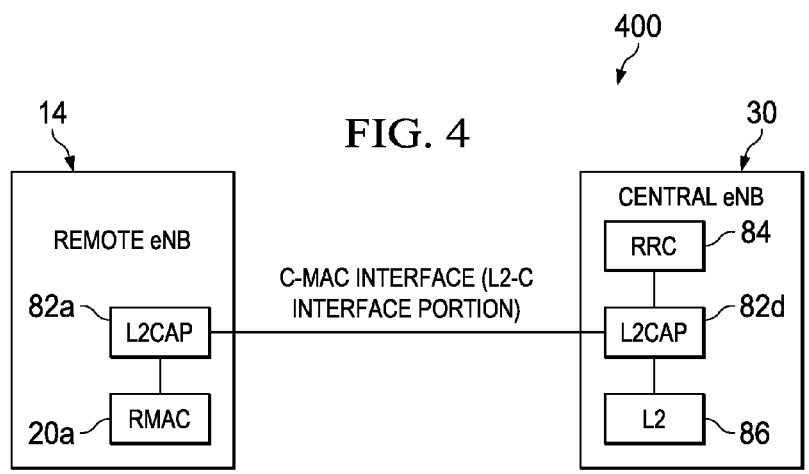
FIG. 4 is a simplified block diagram illustrating additional details associated with one potential embodiment of the communication system.

Turning to FIG. 4, FIG. 4 is a simplified block diagram 400 illustrating example details associated with one example logical separation of the C-MAC interface between central eNB 30 and remote eNB 14 in accordance with one embodiment of the present disclosure. Note the example logical separation shown in FIG. 4 may apply equally to the C-MAC interface between central eNB 30 and remote eNBs 16, 18. FIG. 4 illustrates remote eNB 14 including R-MAC layer 20a and a Layer 2 Control Application Protocol (L2CAP) layer 82a. Central eNB 30 includes an L2CAP layer 82d, a Radio Resource Control (RRC) layer 84 and Layer 2 (L2) element(s) 86, which can include central MAC layer 26 (not shown in FIG. 4).

As shown in FIG. 4, the C-MAC interface between central eNB 30 and remote eNB 14 may provide for a logical separation into a Layer 2 configuration (L2-C) interface portion that may support an L2CAP messaging set defining the configuration interface between central eNB 30 and remote eNB 14 to enable central eNB 30 to control the set-up and operation of remote eNB 14 (and/or remote eNBs 16, 18). In various embodiments, L2CAP layer 82a and L2CAP layer 82d can include logic to facilitate the configuration, operation, communication between central eNB 30 and remote eNB 14 (and/or remote eNBs 16, 18) via L2CAP messaging for the L2CAP interface portion of the C-MAC interface.

In various embodiments, the normal configuration controller of central Layer 2 element(s) 86 may use the L2-C interface portion to configure remote Layer 2 elements of remote eNB 14 (e.g., R-MAC layer 20a) that may be needed for operating and/or interfacing between central eNB 30 and remote eNB 14. In general, the L2-C interface portion may provide an out of band command interface between central eNB 30 and one or more remote eNBs (e.g., remote eNB 14).

Although FIG. 4 illustrates an embodiment of the L2-C interface portion as an interwork to central eNB Layer 2 elements, this is not mandatory. Analogous to the S1AP defined in 3GPP standards, the L2-C interface can, in various embodiments, be used to interwork the control procedures of two separated network elements (e.g., central eNB 30 and remote eNB 14, 16, 18). In various embodiments, the L2-C interface portion may use Stream Control Transmission Protocol (SCTP)/IP for its transport connection between remote eNB 14, 16, 18 and central eNB 30. In various embodiments, other more lightweight transmission protocols may be used for the transport connection between the remote eNB and the central eNB. In various embodiments, the discovery and connection procedures can be analogous to S1AP and its SCTP connection between an eNB and an MME as prescribed by 3GPP standards. It should be understood that each of remote eNBs 16 and 18 can include features similar to those as illustrated in FIG. 4 for remote eNB 14.

Figure 5:
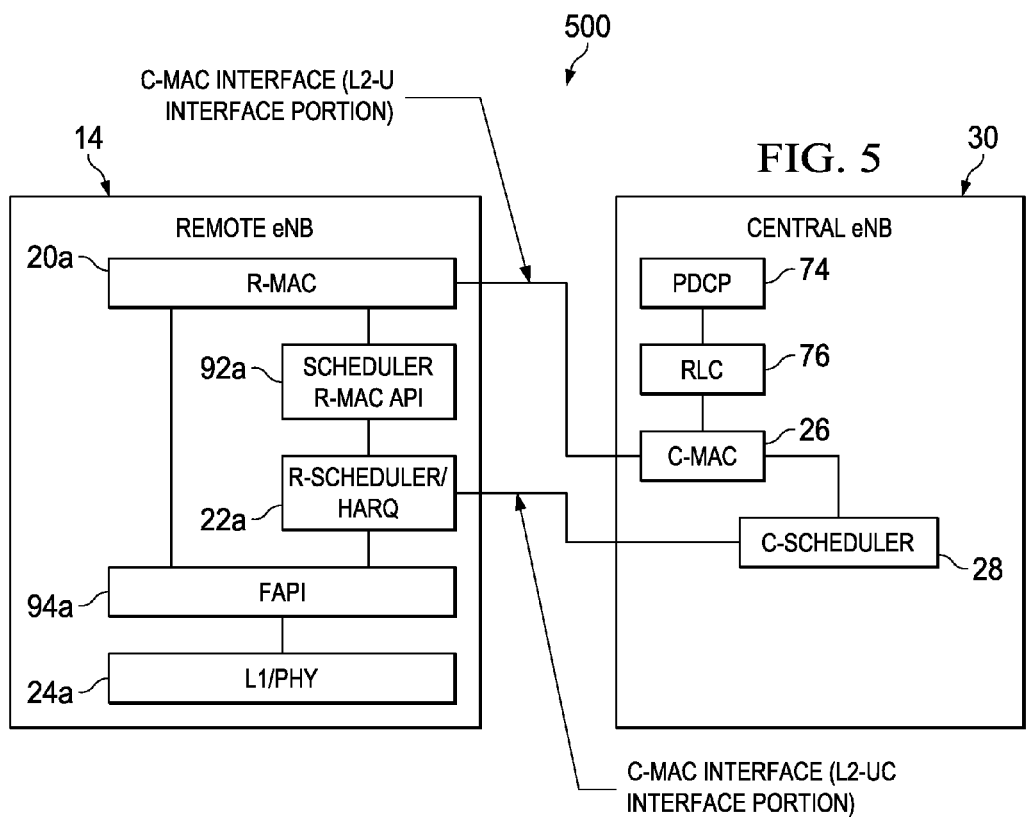
FIG. 5 is a simplified block diagram illustrating yet other details associated with one potential embodiment of the communication system.

Turning to FIG. 5, FIGURE is a simplified block diagram 500 illustrating other example details associated with another example logical separation of the C-MAC interface between central eNB 30 and remote eNB 14 in accordance with one embodiment of the present disclosure. Note the logical separation shown in FIG. 5 may apply equally to the C-MAC interface between central eNB 30 and remote eNBs 16, 18. FIG. 5 illustrates remote eNB 14 including R-MAC layer 20*a*, R-Scheduler 22*a* (including HARQ functionality, identified as R-Scheduler/HARQ 22*a*), L1 (PHY) layer 24*a*, a scheduler R-MAC Application Programming Interface (API) 92*a* and a femtocell API (FAPI) 94*a*. Central eNB 30 includes central MAC layer 26, C-Scheduler 28, PDCP layer 74 and RLC layer 76.

As shown in FIG. 5, the C-MAC interface between central eNB 30 and remote eNB 14 may also provide for a logical separation into a Layer 2 user data (L2-U) interface portion and a Layer 2 user data configuration (L2-UC) interface portion. In various embodiments, the L2-U interface portion may logically join the MAC elements of central eNB 30 and remote eNB 14. In at least one embodiment, the L2-U interface portion may carry packetized user data in both directions encapsulated in GTPu tunnels as configured through L2CAP (e.g., via L2CAP configuration operations performed between central eNB 30 remote eNB 14). In other embodiments, the L2-U interface portion may carry packetized user data according to other protocols including, but not limited to, UDP/IP, a remote authentication dial in user service (RADIUS) protocol, DIAMETER-based protocols, a terminal access controller access-control system (TACACS), TACACS+, Proxy Mobile IP version 6 (PMIPv6), Proxy Mobile IP version 4 (PMIPv4), Extensible Messaging and Presence Protocol (XMPP), Generic Routing Encapsulation, etc.

In various embodiments, the L2-UC interface portion of the C-MAC interface may provide a direct connection between R-Scheduler 22*a* and C-Scheduler 28. In various embodiments, the L2-UC interface portion may include link quality ranges in order for C-Scheduler 28 to deliver scheduling commands (e.g., primary and/or secondary block time scheduling decisions) to R-Scheduler 22*a* in a timely manner.

In various embodiments, scheduler R-MAC API 92*a* may include logic (e.g., software and/or hardware) to facilitate configuration, operation, communication, etc. between R-Scheduler/HARQ 22*a* and C-Scheduler 28. In various embodiments, FAPI 94*a* may include logic to facilitate configuration, operation, communication, etc. between R-MAC 20*a* and L1 (PHY) layer 24*a* for remote eNB 14. It should be understood that each of remote eNBs 16 and 18 can include features similar to those as illustrated in FIG. 5 for remote eNB 14.

Turning to FIG. 6, FIG. 6 is simplified flow diagram 600 illustrating example flows associated with providing centralized LTE MAC scheduling in a particular use case in accordance with one potential embodiment of the communication system. FIG. 6 includes C-Scheduler 28 for central eNB 30 (C-eNB) and R-Scheduler 22*a* for remote eNB 14 (R-eNB). Generally, FIG. 6 illustrates C-Scheduler command indications (ind) being communicated to R-Scheduler 22*a* and R-Scheduler report indications (e.g., periodic status reports and/or HARQ reports) being communicated to C-Scheduler 28 for an example link quality use case for the L2-UC interface portion of the C-MAC interface in which the link latency is 2 msec with no jitter. Note the flows as illustrated in FIG. 6 correspond to a configuration for primary and secondary block time scheduling decisions as shown in TABLE 3, discussed below, while example SFN/SF descriptions provided in TABLE 1 and TABLE 2, also discussed below, provide illustrative information that can be used to identify certain issues that can be caused with regard to operations between central eNB 30 and remote eNB 14 when a 2 msec link latency and no jitter may be present for uplink and downlink L2-UC communications between central eNB 30 and remote eNB 14. For the TABLES, received communications are denoted with an 'Rx' label and transmitted communications are denoted with a 'Tx' label.

In this case, the minimum cycle time for a single downlink subframe command with resultant HARQ report is derived as shown in Table 1 (time is illustrated as a notional System Frame Number/Subframe (SFN/SF), assuming a 1 msec subframe rate):

TABLE 1

| | |
|---|---|
| 100/0 | C-Scheduler Command Tx from C-eNB |
| 100/2 | C-Scheduler Command Rx at R-eNB |
| 100/3 | Schedule Downlink Config/Transmit Data |
| 100/5 | Over-the-Air (OTA) Transmit |
| 100/9 | OTA Receive (UE HARQ Response) |
| 101/0 | HARQ Indication Rx at R-eNB |
| 101/1 | R-Scheduler Report Ind Tx at R-eNB |
| 101/3 | R-Scheduler Report Ind Rx at C-eNB |

As shown in TABLE 1, the minimum cycle time for C-Scheduler 28 to react to a HARQ indication is 13 msec. This may be too long of a duration for the C-Scheduler to react to the HARQ Indication (especially if it was NACK) in an efficient manner given a single UE maximum throughput, which typically needs a 7 msec turn-around as with the standard eNB subframe processing. Thus, TABLE 1 confirms that even under ideal link latency conditions the R-Scheduler may need to react to a HARQ response in an autonomous way. Further, an idealized efficient configuration for the air interface is to send a C-Scheduler command every 1 msec, but this is not a viable solution for a link with latency and may not scale well from a central eNB perspective.

Consider an example involving a 4 msec primary C-Scheduler command duration. In this example, a 4 msec primary C-Scheduler command duration would mean that the full 4 msec block may be reported back and received by the C-Scheduler 16 msec after the C-Scheduler Command was sent. This may represent a 'best case' scenario, however even in this example link scenario, the C-Scheduler may be unable to make a scheduling decision before the second HARQ retransmission window, which, in turn, may lead instead to a 2 msec primary C-Scheduler command duration and a 1 msec R-Scheduler report. Accordingly, this example highlights how link latency can dictate the C-Scheduler rate.

For uplink (UL) processing, C-Scheduler 28 may command remote eNB regarding for who (e.g., which UE) and how much (e.g., how many resources) to grant and schedule, but R-scheduler 22a may perform the subframe rate application of the command(s). For example, in the present example, remote eNB 14 may run the normal subframe flow to grant the UE permission (and an amount) to transmit four (4) subframes before the actual UE transmission occurs. The remote eNB will then receive the uplink data three (3) subframes later. Therefore, at the remote eNB, there is a seven (7) subframe turn-around time between R-Scheduler command reception and uplink data reception. The resultant HARQ response may be handled locally at the remote eNB and therefore may not be exposed to the C-Scheduler (however, the C-Scheduler may be aware of this occurring for resource management). The minimum cycle time for a single uplink subframe command may be derived as shown in TABLE 2 (time is a notional SFN/SF):

TABLE 2

| 100/0 | C-Scheduler Command Tx from C-eNB |
| 100/2 | C-Scheduler Command Rx at R-eNB |
| 100/3 | Schedule Uplink Config (grant) |
| 100/5 | OTA Transmit (grant) |
| 100/7 | Schedule Uplink Config (data) |
| 100/9 | OTA Receive (data) |
| 101/0 | Cyclic Redundancy Check (CRC) Indication/UL Data |
| 101/1 | HARQ Response |
| 101/1 | R-Scheduler Report Ind Tx at R-eNB |
| 101/3 | R-Scheduler Report Ind Rx at C-eNB |

Thus, TABLE 2 illustrates that while the flow at the remote eNB is quite different between uplink (UL) and downlink (DL), the end point timings from a C-Scheduler command to an R-Scheduler report (single subframe) may be the same. Thus, a configuration for the use case shown in FIG. 6 may be provided as shown in TABLE 3:

TABLE 3

| C-Scheduler Command period | 4 msec |
| C-Scheduler Command (primary duration) | 4 msec |
| C-Scheduler Command (secondary duration) | 1 msec |
| R-Scheduler Report period | 2 msec |
| Time to first HARQ response at C-Scheduler | 13 msec |
| Time to full HARQ response at C-Scheduler | 16 msec |

FIG. 6 illustrates flows between R-Scheduler 22a and C-Scheduler 28 according to the configuration shown in TABLE 3 for a 2 msec link latency, no jitter use case. As shown in TABLE 3, central eNB 30 via C-Scheduler 28 can be configured to include 4 msec primary block time commands (e.g., scheduling decisions for a 4 msec primary duration) and 1 msec secondary block time commands (e.g., scheduling decisions for a 1 msec secondary duration) in each command indication sent to R-Scheduler 14a. The command indications can be sent at a rate of 4 msec to R-Scheduler 22a.

In various embodiments, C-Scheduler command indications can include primary and secondary block time scheduling commands (e.g., scheduling decisions) to be carried out by R-Scheduler 22a for UE communications. As there are four (4) subframes of command (e.g., scheduling decisions) included in each command indication from C-Scheduler 28, the 4 corresponding HARQ responses to R-Scheduler 22a will be received over a msec duration. As status reports are being sent by R-Scheduler 22a every 2 msec, the HARQ responses to C-Scheduler 28 can be spread over 2 or 3 status reports, which can result in the 'Time to first HARQ' and 'Time to full HARQ' responses as shown in TABLE 3. Although the example flows are shown in FIG. 6 with respect to R-Scheduler 22a, it should be understood that the R-Scheduler(s) 22b, 22c could be operated in a similar manner.

Figure 7B:
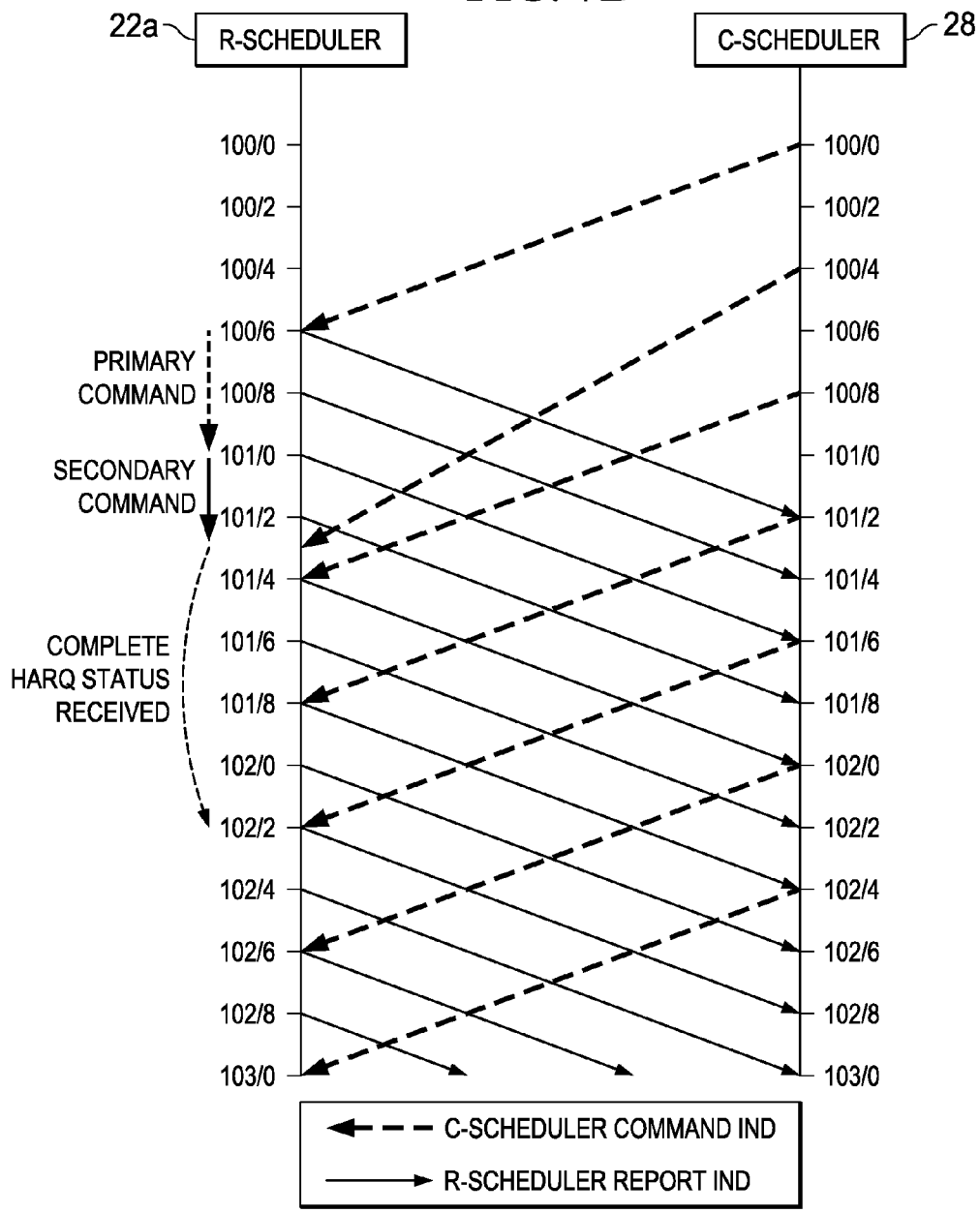

Turning to FIGS. 7A-7B, FIGS. 7A-7B are simplified flow diagrams 700A-700B illustrating other example flows associated with providing centralized LTE MAC scheduling in other use cases in accordance with various potential embodiment of the communication system. Turning to FIG. 7A, FIG. 7A includes C-Scheduler 28 for central eNB 30 (C-eNB) and R-Scheduler 22a for remote eNB 14 (R-eNB). Generally, FIG. 7A illustrates C-Scheduler command indications (ind) being communicated to R-Scheduler 22a and R-Scheduler report indications (e.g., periodic status reports and/or HARQ reports) being communicated to C-Scheduler 28 for an example link quality use case for the L2-UC interface portion of the C-MAC interface in which the link latency is 6 msec with no jitter. Generally, FIG. 7B illustrates C-Scheduler Command indicators being communicated to R-Scheduler 22a and R-Scheduler report indications being communicated to C-Scheduler 28 for an example link quality use case in which the link latency is 6 msec with a 3 msec jitter.

Note the flows as illustrated in FIG. 7A correspond to a configuration for primary and secondary block time scheduling decisions as shown in TABLE 5, discussed below, while example SFN/SF descriptions provided in TABLE 4, also discussed below, provide illustrative information that can be used to identify certain issues that can be caused with regard to operation between central eNB 30 and remote eNB 14 when a six (6) msec link latency and no jitter may be present for uplink and downlink L2-UC communications between central eNB 30 and remote eNB 14. Note additionally the flows as illustrated in FIG. 7B also correspond to a configuration for primary and secondary block time scheduling decisions as shown in TABLE 5, for an example use case in which, due to a six (6) msec link latency and three (3) msec jitter that may be present for uplink and downlink L2-UC communications between central eNB 30 and remote eNB 14, a given subsequent C-Scheduler command indication is not received by R-Scheduler 22a within the configured 4 msec command period, thereby causing R-Scheduler to revert to use of secondary block time scheduling decisions, which have been configured for on a 4 msec block time basis.

For the use case shown in FIG. 7A, the minimum cycle time for a single downlink subframe command with resultant HARQ report is derived as shown in TABLE 4 (time is illustrated a notional SFN/SF, assuming a 1 msec subframe rate):

TABLE 4

| 100/0 | C-Scheduler Command Tx from C-eNB |
| 100/6 | C-Scheduler Command Rx at R-eNB |
| 100/7 | Schedule Downlink Config/Transmit Data |
| 100/9 | OTA Transmit |

TABLE 4-continued

| 101/3 | OTA Receive (HARQ Response) |
| 101/4 | HARQ Indication |
| 101/5 | R-Scheduler Report Ind Tx at R-eNB |
| 102/1 | R-Scheduler Report Ind Rx at C-eNB |

As shown in TABLE 4, the minimum cycle time for the C-Scheduler is 21 msec or could be 27 msec with the worst case jitter. In order to limit the delay between reactive C-Scheduler commands to three retransmit HARQ cycles, a configuration for C-Scheduler 28 primary and secondary block time scheduling decisions and R-Scheduler reporting may be provided as shown in TABLE 5:

TABLE 5

| C-Scheduler Command period | 4 msec |
| C-Scheduler Command (primary duration) | 4 msec |
| C-Scheduler Command (secondary duration) | 4 msec |
| R-Scheduler Report period | 2 msec |
| Time to first HARQ response at C-Scheduler (0 msec jitter) | 21 msec |
| Time to full HARQ response at C-Scheduler (0 msec jitter) | 24 msec |

FIG. 7A illustrates flows associated with the proposed configuration of TABLE 5 with the C-Scheduler cycle time for notification of completion of the first primary duration command being received at the C-Scheduler at 102/4. However, the R-Scheduler report indication sent 2 subframes before that (e.g., Tx at 101/6) and received at the C-Scheduler at 102/2 will contain feedback (e.g., from a HARQ and radio channel quality perspective) on the first 2 subframes of block time transmissions for the 4 msec C-Scheduler command duration, which may give the C-Scheduler an indication of transmissions success thereby enabling the C-Scheduler to react accordingly (e.g., adjust command period, primary duration, etc.). Thus, FIG. 7A illustrates that for a given latency, one component to enable C-Scheduler reactivity may be the frequency of R-Scheduler report indications.

Turning to FIG. 7B, FIG. 7B illustrates other flows associated with the proposed configuration of TABLE 5 for a use where wherein the link latency is 6 msec with a 3 msec jitter for L2-UC communications between central eNB 30 and remote eNB 14. In particular, FIG. 7B illustrates how R-Scheduler 22a may deal with jitter of C-Scheduler 28 command indications when a subsequent C-Scheduler 28 command indication is not received at the expected rate of 4 msec. In this example, a subsequent C-Scheduler command indication, which was expected to be received at 101/0, actually arrives 3 msec late, which forces R-Scheduler 22a to take direction from the previous C-Scheduler Command's secondary block time scheduling decisions configured on a 4 msec block time basis. In various embodiments, when a late C-Scheduler command indication does arrive (e.g., at approximately 101/3), the command indication may take precedence over any current secondary level command currently being processed by R-Scheduler 22a until the next C-Scheduler command indication arrives. In various embodiments, C-Scheduler 28 command indications can include primary and secondary block time scheduling commands (e.g., scheduling decisions) to be carried out by R-Scheduler 22a for UE communications.

In the scenario shown in FIG. 7B, R-Scheduler 22a may process three subframes of secondary block time scheduling decisions and one subframe of the primary block time scheduling decisions received in the subsequent C-Scheduler command indication before another subsequent C-Scheduler command indication arrives at 101/4. In various embodiments, R-Scheduler report indications may continue to flow as normal at a 2 msec rate and by the time one subframe of the late C-Scheduler command indication has been turned around for the HARQ response (e.g., received by C-Scheduler 28 at 102/8 as would be expected even if the C-Scheduler command indication was not late), C-Scheduler 28 may have all the information it needs to continue generating block time scheduling decisions as normal. Given the link scenario shown in FIG. 7B, it can be expected that C-Scheduler 28 may be able to make complete subframe scheduling decisions for the majority of the time while only resorting to secondary (e.g., R-Scheduler 22a derived, in some embodiments) subframe scheduling decisions when the link jitter may be an issue. Although the example flows are shown in FIGS. 7A and 7B with respect to R-Scheduler 22a, it should be understood that the R-Scheduler(s) 22b, 22c could be operated in a similar manner.

Turning to FIG. 8, FIG. 8 is a simplified flow diagram illustrating example operations 800 associated with providing centralized LTE MAC scheduling in accordance with one potential embodiment of communication system 10. In various embodiments, operations 800 can be performed via a central baseband unit (e.g., central eNB 30), one or more remote radio units (e.g., remote eNBs 14, 16, 18) and one or more UE (e.g., UE 12).

In various embodiments, data (e.g., user data) can be communicated to a given UE (e.g., UE 12) for one more subscriber/UE Data Sessions such as, for example, an IP-CAN session, a PDN session, etc. which supports one or more data flows for the subscriber/UE. Thus, operations may begin at 802 in which data associated with the UE at a given central baseband unit (e.g., central eNB 30). At 804, the operations can include determining one or more block time scheduling decisions for a plurality of subframes associated with the data. In various embodiments, each block time scheduling decision can include primary block time scheduling decisions associated with scheduling decisions across a first duration and/or secondary block time scheduling decisions across a second duration. In various embodiments, the first duration and the second duration can be the same, different or, in some embodiments, the first duration may be longer than the second duration.

At 806, the operations can include communicating the data to a remote radio unit in communication with the UE via an over-the-air interface. At 808, the operations can include communicating the one or more block time scheduling decisions to the remote radio unit. At 810, the operations can include communicating the data to the UE from the remote radio unit based, at least in part, on the one or more block time scheduling decisions received from the central baseband unit and the operations may end. It should be understood that example operations 800 can be repeated for all data that is to be communicated to a given UE.

Turning to FIG. 9, FIG. 9 is a simplified flow diagram illustrating other example operations 900 associated with providing centralized LTE MAC scheduling in accordance with one potential embodiment of communication system 10. In particular, example operations 900 may be associated with embodiments that provide for using two-tiered block time scheduling decisions for communicated downlink data to a given UE. In various embodiments, operations 900 can be performed via a central baseband unit (e.g., central eNB 30), a given remote radio unit (e.g., remote eNB 14, 16, 18) and a given UE (e.g., UE 12).

In various embodiments, data (e.g., user data) can be communicated to a given UE (e.g., UE 12) for one more subscriber/UE Data Sessions such as, for example, an IP-CAN session, a PDN session, etc. which supports one or more data flows for the subscriber/UE. Thus, the operations can begin at 902 in which the given remote radio unit can determine whether data is present at the remote radio unit that is to be communicated to the given UE (e.g., whether data for the UE has been received from a central baseband unit). If there is no data present at the remote radio unit that is to be communicated to the UE, the operations may end. Otherwise, if there is data present at the remote radio unit that is to be communicated to the UE, the operations will continue to 904 in which the remote radio unit (e.g., via the R-Scheduler for the remote radio unit) may determine whether a command associating with communicating the data to the UE has been received from the central baseband unit within a predetermined time window. In various embodiments, the predetermined time window can be related to the duration primary block time scheduling decisions configured for communication system 10 such that the predetermined time window may be equal to or less than the duration of primary block time scheduling decisions configured for the communication system.

If a command associated with communicating the data to the UE has been received by the remote radio unit, the operations may continue to 906 in which the remote radio unit can communicate at least a portion of data (e.g., a number of subframes including portions of the data) to the UE based, at least in part, on primary block time scheduling decisions included in the command received from the central baseband unit. Following the operations at 906, the operations can return to 902 in which the remote radio unit can determine whether there is data present (e.g., more data present) that is to be communicated to the UE and the operations can continue as discussed herein.

For the operations at 904, if the remote radio unit determines that a command associated with communicating the data to the UE has not been received within the predetermined time window, the remote radio unit may wait for expiration of the time window (e.g., cycle through 908 and 910). If the remote radio unit determines that the window has expired at 910 and no command has been received from the central baseband unit, the operations can continue to 912 in which the remote radio unit can determine whether secondary block time scheduling decisions were including in a previous command received from the central baseband unit. In various embodiments, operations 912 assume that at least one command associated with communicating the data to the UE has been received from the central baseband unit.

If the remote radio unit determines at 912 that secondary block time scheduling decisions were included in the previous command, the operations can continue to 914 in which the remote radio unit can begin to communicate at least a portion of the data to the UE based, at least in part, on the secondary block time scheduling decisions included in the previous command. Operations at 914 can continue with the remote radio unit communicating data to the UE according to secondary block time scheduling decisions in parallel with operations 902, 904, 908 and 910 as the remote radio unit awaits a subsequent command to be received from the remote radio unit. Once a subsequent command is received at the remote radio unit, the remote radio unit can switch from using the secondary block time scheduling decisions at 914 back to using primary block time scheduling decisions for communicating the data to the UE, as discussed at 906, and the operations can continue until there is no more data present at the remote radio unit that is to be communicated to the UE and the operations may end.

For the operations at 912, if the remote radio unit determines that secondary block time scheduling decisions were not included in the previous command, the operations can continue to 916 in which the remote radio unit can begin to communicate at least a portion of the data to the UE based, at least in part, on secondary block time scheduling decisions derived by the remote radio unit itself. Operations at 916 can continue with the remote radio unit communicating data to the UE according to secondary block time scheduling decisions in parallel with operations 902, 904, 908, and 910 as the remote radio unit awaits a subsequent command to be received from the remote radio unit. Thus, the remote radio unit can autonomously determine secondary block time scheduling decisions for communicating the data to the UE until a subsequent command is received from the central baseband unit. Once a subsequent command is received at the remote radio unit, the remote radio unit can switch from using the self-derived secondary block time scheduling decisions at 916 back to using primary block time scheduling decisions for communicating the data to the UE, as discussed at 906, and the operations can continue until there is no more data present at the remote radio unit that is to be communicated to the UE and the operations may end.

Note that in this Specification, references to various features (e.g., elements, structures, modules, components, steps, operations, characteristics, etc.) included in 'one embodiment', 'example embodiment', 'certain embodiment', 'an embodiment', 'another embodiment', 'some embodiments', 'various embodiments', 'other embodiments', 'certain embodiments', 'alternative embodiment', and the like are intended to mean that any such features are included in one or more embodiments of the present disclosure, but may or may not necessarily be combined in the same embodiments. Note also that a scheduler as used herein in this Specification, can be inclusive of an executable file comprising instructions that can be understood and processed on a computer, and may further include library modules loaded during execution, object files, system files, hardware logic, software logic, or any other executable modules.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding flows and activities have been offered for purposes of example and discussion. Substantial flexibility is provided by communication system 10 in that any suitable arrangements, chronologies, configurations, and timing mechanisms may be provided without departing from the teachings provided herein.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words 'means for' or 'step for' are specifically used in the particular claims; and (b) does not intend, by any statement in the specification, to limit this disclosure in any way that is not otherwise reflected in the appended claims.

What is claimed is:

1. A method for a communication network comprising:
   receiving data associated with a user equipment (UE) at a central baseband unit;
   determining one or more block time scheduling decisions for a plurality of subframes associated with the data, wherein at least one block time scheduling decision comprises scheduling decisions for multiple subframes;
   communicating the data to a remote radio unit;
   communicating the one or more block time scheduling decisions to the remote radio unit; and
   communicating the data to the UE from the remote radio unit based, at least in part, on the one or more block time scheduling decisions, wherein the data is communicated to the UE based on a primary block time scheduling decision included in the one or more scheduling decisions communicated to the remote radio unit and a secondary block time scheduling decision, wherein the primary block time scheduling decision applies to a longer duration of data than the secondary block time scheduling decision.

2. The method of claim 1, wherein communicating the one or more block time scheduling decisions to the remote radio unit is performed at a first rate and wherein communicating the data to the remote radio unit is performed at a second rate.

3. The method of claim 2, wherein the second rate is out of band from the first rate.

4. The method of claim 1, further comprising:
   communicating one or more status reports to the central baseband unit from the remote radio unit, wherein the status reports are associated with the data to be communicated with the UE.

5. The method of claim 4, further comprising:
   updating a rate associated with communicating the data to the remote radio unit based on a particular status report received from the remote radio unit.

6. The method of claim 1, wherein the central baseband unit is a central evolved Node B (eNodeB) without a Radio Frequency (RF) Layer 1 (L1) physical layer and wherein the remote radio unit is a remote eNodeB including an RF L1 physical layer.

7. The method of claim 6, wherein the central eNodeB is a part of virtualized computing platform operating in at least one of:
   a data center; and
   a cloud server center.

8. The method of claim 1, wherein the secondary block time scheduling decision is determined at the remote radio unit.

9. The method of claim 1, further comprising:
   determining one or more other block time scheduling decisions for a plurality of subframes associated with other data associated with one or more other UE;
   communicating the other data to one or more other remote radio units;
   communicating the one or more other block time scheduling decisions to the one or more other remote radio units; and
   communicating the other data to the one or more other UE from the one or more other remote radios unit based, at least in part, on the one or more other block time scheduling decisions.

10. One or more non-transitory tangible media encoding logic that includes instructions for execution by a processor, wherein the execution causes the processor to perform operations, comprising:
    receiving data associated with a user equipment (UE) at a central baseband unit;
    determining one or more block time scheduling decisions for a plurality of subframes associated with the data, wherein at least one block time scheduling decision comprises scheduling decisions for multiple subframes;
    communicating the data to a remote radio unit;
    communicating the one or more block time scheduling decisions to the remote radio unit; and
    communicating the data to the UE from the remote radio unit based, at least in part, on the one or more block time scheduling decisions, wherein the data is communicated to the UE based on a primary block time scheduling decision included in the one or more scheduling decisions communicated to the remote radio unit and a secondary block time scheduling decision, wherein the primary block time scheduling decision applies to a longer duration of data than the secondary block time scheduling decision.

11. The media of claim 10, wherein communicating the one or more block time scheduling decisions to the remote radio unit is performed at a first rate and wherein communicating the data to the remote radio unit is performed at a second rate and wherein the second rate is out of band from the first rate.

12. The media of claim 10, wherein the execution causes the processor to perform operations, comprising:
communicating one or more status reports to the central baseband unit from the remote radio unit, wherein the status reports are associated with the data to be communicated with the UE.

13. The media of claim 12, wherein the execution causes the processor to perform operations, comprising:
updating a rate associated with communicating the data to the remote radio unit based on a particular status report received from the remote radio unit.

14. The media of claim 10, the secondary block time scheduling decision is determined at the remote radio unit.

15. A system comprising:
a central baseband unit comprising at least one memory element for storing first data, at least one processor that executes instructions associated with the first data and a central scheduler;
a remote radio unit comprising at least one memory element for storing second data, at least one processor that executes instructions associated with the second data and a remote scheduler, wherein the central baseband unit and the remote radio unit operate to perform operations for the system comprising:
receiving user equipment (UE) data associated with a UE at the central baseband unit;
determining one or more block time scheduling decisions for a plurality of subframes associated with the UE data, wherein at least one block time scheduling decision comprises scheduling decisions for multiple subframes;
communicating the UE data to the remote radio unit;
communicating the one or more block time scheduling decisions to the remote radio unit; and
communicating the UE data to the UE from the remote radio unit based, at least in part, on the one or more block time scheduling decisions, wherein the data is communicated to the UE based on a primary block time scheduling decision included in the one or more scheduling decisions communicated to the remote radio unit and a secondary block time scheduling decision, wherein the primary block time scheduling decision applies to a longer duration of data than the secondary block time scheduling decision.

16. The system of claim 15, further comprising:
an interface interconnecting the central baseband unit with the remote radio unit and one or more other remote radio units, wherein the interface comprises a logical separation into at least one data plane portion and at least one control plane portion.

17. The system of claim 16, wherein the at least one data plane portion of the interface includes a user data plane interface to communicate the UE data from a central Media Access Control (MAC) layer of the central baseband unit to a remote MAC layer of the remote radio unit.

18. The system of claim 16, wherein the at least one control plane portion of the interface includes a first control plane interface to communicate the block time scheduling decisions between the central scheduler of the central baseband unit and the remote scheduler of the remote radio unit.

19. The system of claim 16, wherein the at least one control plane portion of the interface includes a second control plane interface to allow the central baseband unit to configure operation of the remote radio unit.

20. The system of claim 15, wherein the central baseband unit is a central evolved Node B (eNodeB) without a Radio Frequency (RF) Layer 1 (L1) physical layer and wherein each remote radio unit is a remote eNodeB including an RF L1 physical layer.

* * * * *